United States Patent
Wang et al.

(10) Patent No.: US 11,522,177 B2
(45) Date of Patent: Dec. 6, 2022

(54) SYSTEM FOR AN IONIC LIQUID-BASED ELECTROLYTE FOR HIGH ENERGY BATTERY

(71) Applicant: Cuberg, Inc., Emeryville, CA (US)

(72) Inventors: Richard Y. Wang, Davis, CA (US); Jason Koeller, Redwood City, CA (US); Olivia Risset, Oakland, CA (US); Kaixiang Lin, San Francisco, CA (US); Stephen Lawes, Oakland, CA (US); Mauro Pasta, Oxford (GB)

(73) Assignee: Cuberg, Inc., San Leandro, CA (US)

( * ) Notice: Subject to any disclaimer, the term of this patent is extended or adjusted under 35 U.S.C. 154(b) by 279 days.

(21) Appl. No.: 16/715,418

(22) Filed: Dec. 16, 2019

(65) Prior Publication Data

US 2020/0194786 A1   Jun. 18, 2020

Related U.S. Application Data

(60) Provisional application No. 62/784,095, filed on Dec. 21, 2018, provisional application No. 62/780,039, filed on Dec. 14, 2018.

(51) Int. Cl.
*H01M 4/38* (2006.01)
*H01M 10/0525* (2010.01)
(Continued)

(52) U.S. Cl.
CPC ........... *H01M 4/382* (2013.01); *H01M 4/134* (2013.01); *H01M 10/0525* (2013.01);
(Continued)

(58) Field of Classification Search
None
See application file for complete search history.

(56) References Cited

U.S. PATENT DOCUMENTS

| | | |
|---|---|---|
| 5,523,179 A | 6/1996 | Chu |
| 6,410,181 B1 | 6/2002 | Spillman et al. |

(Continued)

FOREIGN PATENT DOCUMENTS

| | | |
|---|---|---|
| CN | 113196539 A | 7/2021 |
| EP | 3057158 A1 | 8/2016 |

(Continued)

OTHER PUBLICATIONS

Andrew Ulvestad, "A Brief Review of Current Lithium Ion Battery Technology and Potential Solid State Battery Technologies", (p. 1-17).

(Continued)

*Primary Examiner* — Christopher P Domone
(74) *Attorney, Agent, or Firm* — Polygon IP, LLP

(57) ABSTRACT

A system for electrical energy production from chemical reagents in a compartmentalized cell includes: at least two electrodes, comprising at least one anode and at least one cathode; at least one separator, that separates the anodes and the cathodes; and an ionic liquid electrolyte system. The system can be a battery or one or more cells of a battery system. The ionic liquid electrolyte system comprises an ionic liquid solvent; an ether co-solvent, comprising a minority fraction, by weight, of the electrolyte; and a lithium salt. In preferred variations, the anode is a lithium metal anode and the cathode is a metal oxide cathode and the separator is a polyolefin separator.

27 Claims, 23 Drawing Sheets

(51) Int. Cl.
*H01M 10/0569* (2010.01)
*H01M 10/0568* (2010.01)
*H01M 4/134* (2010.01)
*H01M 10/0567* (2010.01)
*H01M 50/46* (2021.01)

(52) U.S. Cl.
CPC ... *H01M 10/0567* (2013.01); *H01M 10/0568* (2013.01); *H01M 10/0569* (2013.01); *H01M 50/461* (2021.01)

(56) References Cited

U.S. PATENT DOCUMENTS

| | | | |
|---|---|---|---|
| 9,083,035 B2 | 7/2015 | Yeou et al. | |
| 9,276,292 B1 | 3/2016 | Mackenzie et al. | |
| 2003/0091904 A1 | 5/2003 | Munshi | |
| 2005/0026041 A1 | 2/2005 | Jouanneau et al. | |
| 2005/0153209 A1 | 7/2005 | Vallee et al. | |
| 2006/0063051 A1 | 3/2006 | Jang | |
| 2006/0204855 A1 | 9/2006 | Saruwatari et al. | |
| 2009/0197158 A1 | 8/2009 | Ogawa et al. | |
| 2009/0246625 A1 | 10/2009 | Lu | |
| 2009/0265921 A1* | 10/2009 | Bowden | H01M 10/0568 29/623.1 |
| 2010/0073005 A1 | 3/2010 | Yano et al. | |
| 2013/0011735 A1* | 1/2013 | Nelson | C09D 11/38 429/211 |
| 2013/0101880 A1* | 4/2013 | Marshall | H01M 4/043 429/101 |
| 2013/0260229 A1 | 10/2013 | Uzun et al. | |
| 2013/0266875 A1 | 10/2013 | Matsumoto et al. | |
| 2013/0273443 A1 | 10/2013 | Zhang et al. | |
| 2014/0042988 A1 | 2/2014 | Kuttipillai | |
| 2014/0080008 A1 | 3/2014 | Blanc et al. | |
| 2015/0333309 A1 | 11/2015 | Lai et al. | |
| 2015/0340738 A1* | 11/2015 | Moganty | H01M 10/0525 429/327 |
| 2016/0149212 A1 | 5/2016 | Zaghib et al. | |
| 2016/0172660 A1 | 6/2016 | Fischer et al. | |
| 2016/0294005 A1 | 10/2016 | Lee et al. | |
| 2016/0344063 A1 | 11/2016 | Chang et al. | |
| 2017/0062140 A1 | 3/2017 | Zheng et al. | |
| 2017/0214055 A1 | 7/2017 | Visco et al. | |
| 2018/0062206 A1* | 3/2018 | Yang | H01M 4/382 |
| 2018/0248221 A1 | 8/2018 | Wang et al. | |
| 2018/0366773 A1 | 12/2018 | Endo et al. | |
| 2021/0167424 A1* | 6/2021 | Evans | H01M 10/0569 |

FOREIGN PATENT DOCUMENTS

| | | |
|---|---|---|
| EP | 3895244 A1 | 10/2021 |
| RU | 1840819 C | 1/2012 |
| RU | 2503098 C1 | 12/2013 |
| WO | 2016031688 A1 | 3/2016 |
| WO | WO2020124086 A1 | 12/2019 |

OTHER PUBLICATIONS

Custom Cells Itzehoe—"High Temperature Technology in Competitor Comparison", GMBH Germany. 2020.

Fripp et al., "Development of a High-Temperature Rechargeable Battery for Downhole Use in the Petroleum Industry", Electrochemical Systems, Inc., Offshore Technology Conference, (p. 1-8), May 5-8, 2008.

John T. Warner, "Thermal Runway" —Science Direct, Lithium-Ion Battery Chemistry, 2019 (p. 1-21).

Liu et al., "Advancing Lithium Metal Batteries", Joule, https://doi.org/10.1016/j.joule.2018.03.008, (p. 1-13), May 16, 2018.

Saft—MP, small VL, "High Temperature Rechargeable".

Saft, "LS, LSH—LithiumThionylChlorides".

Wikipedia, "Nickel-Metal hydride battery", Feb. 2, 2020, (p. 1-12).

\* cited by examiner

Adding a lithium metal alloy salt to the electrolyte S110

Exposing an anode base to the electrolyte solution S120

Driving the lithium metal alloy salt onto the anode base S130.

FIGURE 22

SYSTEM FOR AN IONIC LIQUID-BASED ELECTROLYTE FOR HIGH ENERGY BATTERY

CROSS-REFERENCE TO RELATED APPLICATIONS

This Application claims the benefit of U.S. Provisional Application No. 62/780,039, filed on 14 Dec. 2018 and U.S. Provisional Application No. 62/784,095, filed on 21 Dec. 2018, both of which are incorporated in their entireties by this reference.

GOVERNMENT RIGHTS

This invention was made with government support under award number DE-SC0018858 awarded by the Department of Energy and award number 1747377 awarded by the National Science Foundation. The government has certain rights in the invention.

TECHNICAL FIELD

This invention relates generally to the field of high energy batteries, and more specifically to a new and useful system and method for an ionic liquid-based electrolyte.

BACKGROUND

Lithium ion (Li-ion) batteries are indispensable components of modern technology, powering devices as diverse as implantable medical devices and electric vehicles. However, the performance of lithium-ion batteries has plateaued. In the twenty-five years since their invention, the technology has been so optimized that performance is approaching the fundamental limits of the materials that comprise the batteries. Two major drawbacks limit or hinder their application in many existing and emerging technologies.

First, Li-ion batteries have an intrinsically limited energy density. It can be challenging to achieve specific energy beyond 300 Wh/kg at the cell level. Lithium metal is one choice of anode material that has been used to increase energy density. However, the reactivity of Li metal with conventional Li-ion electrolytes based on organic carbonate solvents leads to electrolyte decomposition and depletion, resistance growth, and ultimately extremely low cycle life.

Second, the volatile nature of traditional organic solvent-based lithium battery electrolytes, whether a traditional Li-ion chemistry or a Li-metal chemistry, makes rechargeable Li battery operation very dangerous. If heated internally (e.g. due to internal short circuit, overcharge, puncture, etc.) above a threshold temperature, they will almost instantly go into thermal runaway, releasing large amounts of heat and energy. Pack-level safety engineering can easily reduce energy density and specific energy by 30% or more. It also adds cost and time to the development process of new battery technologies.

Thus, there is a need in the high energy density battery field to create a new and useful rechargeable battery system based on a stable, non-flammable liquid electrolyte, and preferably one that incorporates a metallic anode. This invention provides such a new and useful system and method.

BRIEF DESCRIPTION OF THE FIGURES

FIG. 22 is a flowchart representation of a method of a preferred embodiment.

DESCRIPTION OF THE EMBODIMENTS

The following description of the embodiments of the invention is not intended to limit the invention to these embodiments but rather to enable a person skilled in the art to make and use this invention.

1. Overview

Figure 1:
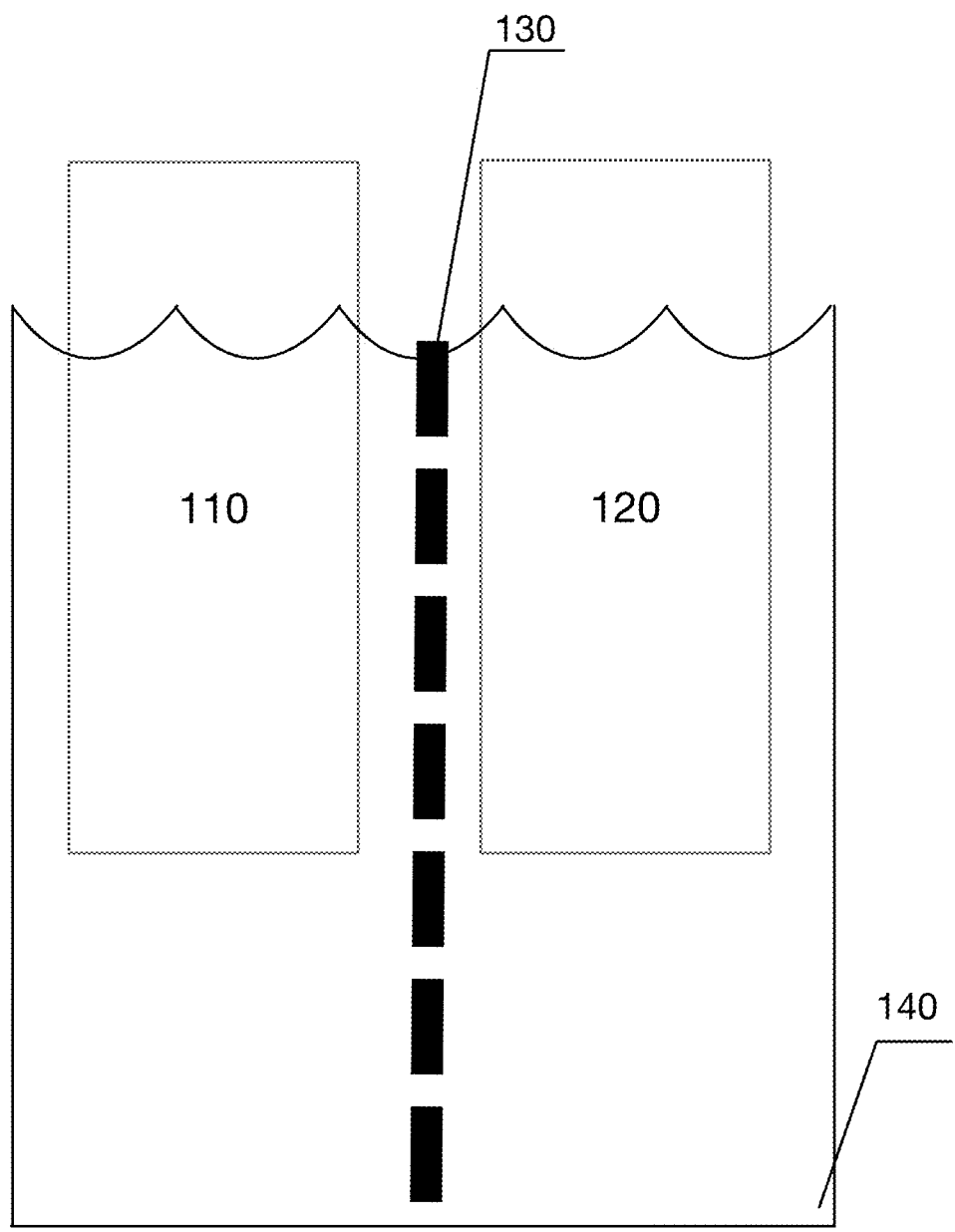
FIG. 1 is a schematic representation of a system of a preferred embodiment.
Figure 2:
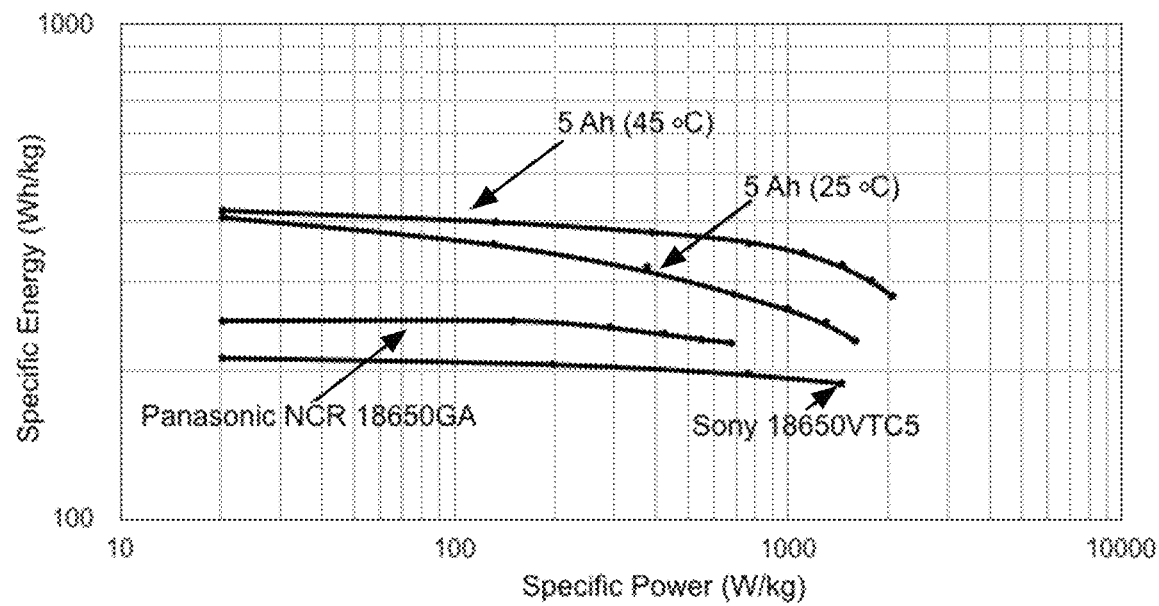
FIG. 2 is a Ragone plot of discharge energy and power for commercial cells and a system of preferred embodiment.

As shown in FIG. 1, a system that comprises a high-voltage cathode with an energy-dense lithium based anode in a stabilizing, non-flammable electrolyte. The system functions as an energy cell to produce electrical energy that dramatically increases energy density as compared to commercially available lithium-ion batteries, while simultaneously being safe (thermally stable). The lithium based anode may comprise a metal or metal alloy that ranges from 10-100% lithium, by weight. Some alternative variations of the system may use alternative metal anodes as described herein. The electrolyte, also referred to as an electrolyte system, includes an ionic liquid-based electrolyte that replaces flammable organic solvent-based electrolytes responsible for the poor safety of lithium-ion batteries. Additionally, the electrolyte system includes an ether co-solvent that dramatically increases the conductivity of the ionic solvent alone. The electrolyte enables commercially available cathode materials to be cycled to a significantly higher voltage (up to 4.6 V), unlocking more lithium storage capability while mitigating many of the typical challenges with cathode degradation in these operating conditions. The electrolyte itself has excellent electrochemical stability. As shown in FIG. 2, some exemplary implementations of the system with the electrolyte can have superior performance as reflected through a Ragone plot when compared to commercial batteries (Panasonic NCR 18650GA and Sony 18650VTC5).

The electrolyte has a number of potential beneficial properties that make it uniquely compatible with Li based anodes. The solvents and salts have improved reductive stability compared to conventional lithium-ion electrolytes, which reduces the amount of electrolyte decomposition that occurs during Li plating. The electrolyte also forms a highly ionically conducting and electronically insulating solid electrolyte interphase (SEI) that enhances uniform Li plating while protecting the electrolyte and electrodes from degradation. All of these elements, in combination, allow the cell to operate reliably and safely with the low electrolyte loading (e.g. less than 0.5 grams of electrolyte per gram of cathode active material) required for high energy density.

The lithium based anode may comprise a lithium metal anode, lithium metal plated in situ on a bare current collector (metal foil or metalized plastic film), and/or a lithium metal alloy composed of lithium with one or multiple other metals (e.g. Si, Al, Mg, Sn, Pb, Cd, Bi, As, Zn, or other metals or combinations of metals which alloy with lithium). Compared to lithium metal anode, the lithium metal plated in situ on a current collector may increase energy density and/or specific energy. The lithium alloy anode may enable increased stability that may be the result of a smoother plating morphology exposing less fresh and reactive metal each cycle. This stability means that Li ions and electrolyte are not constantly consumed during cycling of the battery; thereby mitigating one possible cause of failure inherent in other lithium metal anode implementations. Variations of the system with the stabilizing, non-flammable electrolyte may be used with a lithium metal alloy or may be used with an alternative type of anode such as those described herein.

A preferred anode surface morphology for repeated cycle ability with low interfacial resistance is a smooth plane of metal with uniform and homogeneous SEI. Unfortunately, for Li deposition on Li metal even in the best case of low current densities (away from the transport-limited regime), deposition tends to create a "mossy" surface morphology with high surface area. This large surface area results in the consumption of electrolyte and Li as new SEI (surface electrolyte interphase) is formed on the new surface. The new SEI remains upon subsequent Li stripping, increasing the interfacial resistance with each cycle. This increase in resistance and resulting decrease in capacity is one of the most common non-catastrophic failure mode of secondary batteries based on Li-metal. Thus, an important technical challenge to commercializing the lithium metal anode is to deposit lithium in compact structures with a high volume to surface area ratio, to minimize the new SEI formed for a given quantity of charge plated, which is addressed at least in part by the system and methods described herein.

Ionic liquid-based electrolytes are typically criticized for having poor rate capability, especially at temperatures below 25° C. The electrolyte covered under the present invention contains an ionic liquid blended with an ether co-solvent, which may dramatically improve low temperature performance and rate capability. The choice of lithium salt also has a marked effect on cell rate capability, and the salt compositions used in the present invention have been optimized with this in mind. Thus, as a major benefit, the result is a high energy density cell with impressive rate capability and low temperature performance without any associated instability or safety risks.

Additionally, a Li-M alloy anode may improve the efficiency and reversibility of lithium plating by reducing anode surface area change during charge. It has been shown that the morphology of Li deposited on a copper substrate depends sensitively on the overpotential of deposition. Deposition at higher overpotentials results in a larger density of smaller nuclei, which results in a lower volume to surface area ratio. It is thus advantageous for Li deposition to occur at smaller overpotentials. The deposition overpotential of Li on a substrate depends on the composition of the substrate. It has been observed that for certain substrates, in particular Mg, Zn and Ag, the overpotential is actually lower than for deposition of Li on Li metal for a given current density. Furthermore, the overpotential for deposition of Li on Li—Zn alloys is lower than for deposition on pure Zn, and it is expected that this trend will also apply to Li—Mg and Li—Ag alloys. These observations suggest that surface morphology of cycled anodes composed of various lithium metal alloys will be smoother and will have higher volume to surface area ratios.

As one potential benefit, the lower overpotential of Li deposition observed for certain Li metal alloys may result in a lower interfacial charge-transfer resistance for the deposition and removal of Li from the anode. A lower overpotential lowers the rate of degradation (e.g. from electrolyte decomposition) at a given current density. Conversely, a lower overpotential may increase the rate capability of the anode. Experimental evidence for reduced charge transfer resistance based on electrochemical impedance spectroscopy (EIS) is presented in FIG. 7, where a 60% reduction in impedance after an initial C/20 formation was observed in coin cells containing a 10 wt. % Mg Li—Mg alloy anode compared to identical cells with a pure Li-metal anode.

As another potential benefit, a lithium metal alloy anode may be more resistant to dendrite-induced short circuits which can result in catastrophic cell failure. It is known that the electrodeposition of certain metals, such as Mg, does not create the high surface area structures endemic to Li deposition on Li metal anodes, even at high deposition rates. One plausible explanation for this is the observation that metallic Mg—Mg bonds are 0.18 eV stronger than metallic Li—Li bonds. At ambient temperatures, this translates into a more than 1,000-fold larger driving force for the spontaneous reorganization of deposited atoms into structures with lower surface area in Mg deposition than in Li deposition. Consistent with this idea, it has also been observed that the surface diffusion of Mg in Mg metal is faster than that of Li in Li metal. A rough calculation suggests that the timescale for surface diffusion of Mg is more than short enough to smooth out dendrites as they grow, possibly explaining why Mg deposition on Mg does not result in dendrite formation. As a result of the presence of Mg, it is expected that a Li—Mg alloy anode will have higher bond energies and consequently faster surface diffusion for newly deposited Li than a pure Li metal anode, and that this faster surface diffusion could similarly smooth out Li dendrites as they form. Any increase in the rate of charge possible while avoiding dendrite-induced short circuits would be a significant improvement.

As another potential benefit, combining a Li-M alloy with the electrolyte may improve SEI quality, particularly at room temperature. Two common anions are bis(trifluoromethanesulfonyl)imide ("TFSI") and bis(fluorosulfonyl)imide ("FSI"), which are known to form LiF-rich SEI layers. LiF is known to have desirable SEI properties and lead to stable cycling. Because Li ions must diffuse through the SEI in order to transfer between anode and electrolyte, it is crucial that the SEI have high Li-ion conductivity. The main Li-diffusion carriers in LiF are Li-ion vacancies, and low vacancy concentration is the main cause of diffusion limitation. It is known that doping LiF with Mg and/or Al ions increases the concentration of Li vacancies, which will naturally happen when SEI forms on top of an Li—Mg or Li—Al alloy anode. Thus the combination of alloys of Li—Mg or Li—Al with fluorine-rich anions may produce synergistic effects beyond the benefits associated with each separately.

As another potential benefit, both the electrolyte and lithium metal alloy anodes offer improved thermal stability and safety performance. As mentioned previously, the electrolyte is non-flammable, and as such allows the operation of the battery at elevated temperatures compared to batteries based on conventional organic solvents. The electrolyte also reduces the risk of spontaneous battery combustion and fire initiated by external factors such as overcharging, physical impact, and short circuit; or internal short-circuit due to dendritic Li growth through the separator. Similarly, the lithium metal alloy anode has greater thermal tolerance compared to a lithium metal anode in the sense of having a higher melting point. If a lithium metal anode melts during battery operation, the liquid metal can create massive internal shorting which can quickly generate intense temperatures and pressures within the cell. The melting point of lithium metal is only 180.5° C., well within the range of internal temperatures possible in a shorted, punctured, overcharged, or otherwise abused battery. Alloying lithium with another metal increases its melting point and complements the safety improvements afforded by the electrolyte.

These features provide significant benefits for cell operation in fields requiring high energy density and safety, such as aerospace, defense, oil and gas, medical devices, consumer electronics, and electric vehicles.

2. System

As shown in FIG. 1, a system for electrical energy production from chemical reagents in a compartmentalized cell includes: at least two electrodes, comprising at least one anode 110 and at least one cathode 120; at least one separator 130, that separates the anodes and the cathodes; and an ionic liquid electrolyte system 140. The system can be a battery or one or more cells of a battery system. Preferably, the ionic liquid electrolyte system 140 comprises ionic liquids, ether co-solvents, and lithium salts solute. In preferable variations, the ether co-solvent comprises a minority fraction, by weight, of the solvent electrolyte. In some preferred variations, the anode 110 is a lithium based metal anode, wherein the lithium based metal anode may be a lithium metal anode, lithium metal plated in situ on a current collector (metal foil or metalized plastic film), a lithium alloy anode, and/or some combination including lithium metal and/or lithium alloy(s). Generally speaking, in preferred variations, the lithium-based metal anode 110 contains 10%-100% lithium, by weight. In some preferred variations, the cathode 120 is a metal oxide cathode. In some preferred variations, the separator 130 is a polyolefin separator. The ionic liquid electrolyte system 140 may additionally include additives that may add or improve certain functionalities of the cell. An example of a type of additive in preferred variations include a wetting agent, which functions to reduce the soaking time and to improve wetting uniformity of the polyolefin separator. The system preferably functions as a thermally stable cell with high energy density and high specific energy (henceforth referred to as "high energy density"). In some preferred variations, the cell has a specific energy of at least 350 Wh/kg and 600 Wh/L, and a nominal voltage greater than 3.7 V.

In different variations, the system may contain some or all system components in any suitable combination. The system size and configuration are preferably highly dependent on the implementation. In this manner, the system may comprise a single cell, multiple cells, or sections of a cell as desired. These cells may additionally have an implementation specific geometry.

All of the aforementioned components can be combined into a cell in any level of simple or complex geometries of both the exterior cell shape, and the interior geometries of the cell subcomponents. Interior and exterior geometries may enable specific implementations (e.g. a specific pouch geometry for a mobile phone), custom designed implementations (e.g. custom designed battery cell geometry that fits a unique device), implementations that enable cell/energy generation expansion (e.g. prismatic cell geometries that can be stacked to form multi-cell batteries), or for even generic usage (e.g. a 18650 format cylinder battery that can be put in and taken out of battery appliances). In implementations of the system, subcomponents may be removed and added as desired. The system may thus include additional geometric components and physical components such as: pressure vents, cell case, and/or heat sinks.

Figure 3:
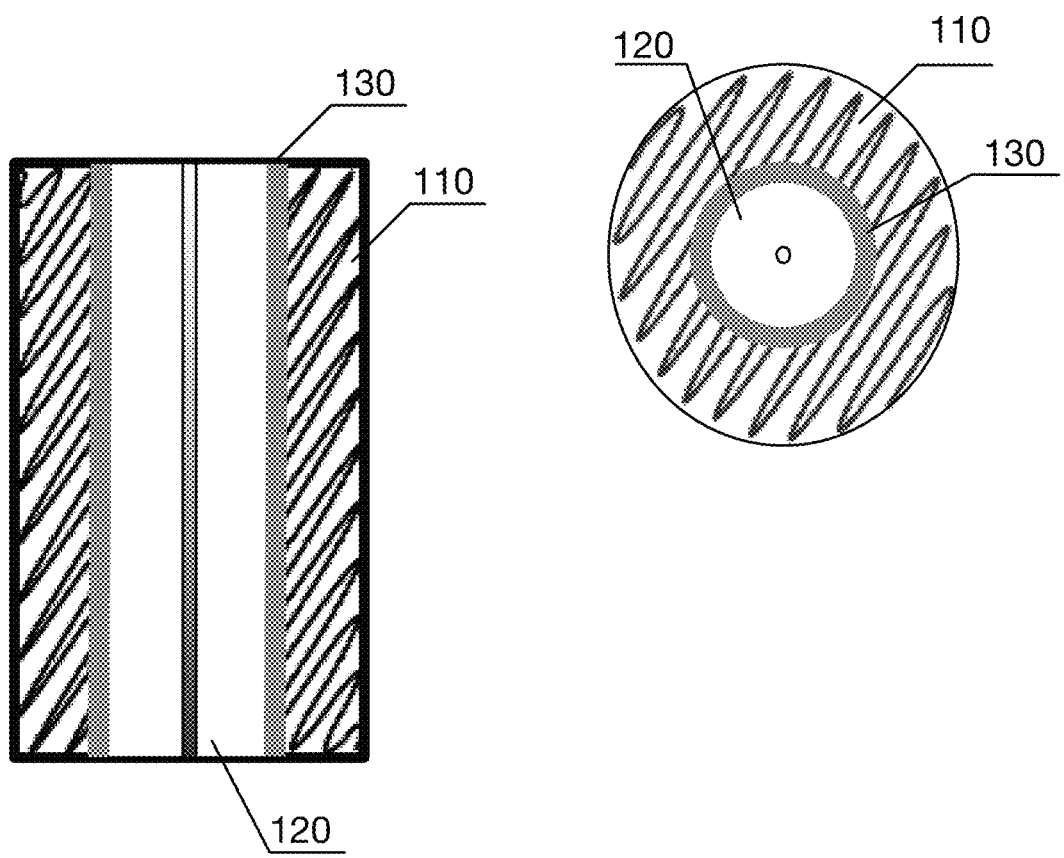
FIG. 3 is one schematic representation of a cylindrical cell of a preferred embodiment.
Figure 4:
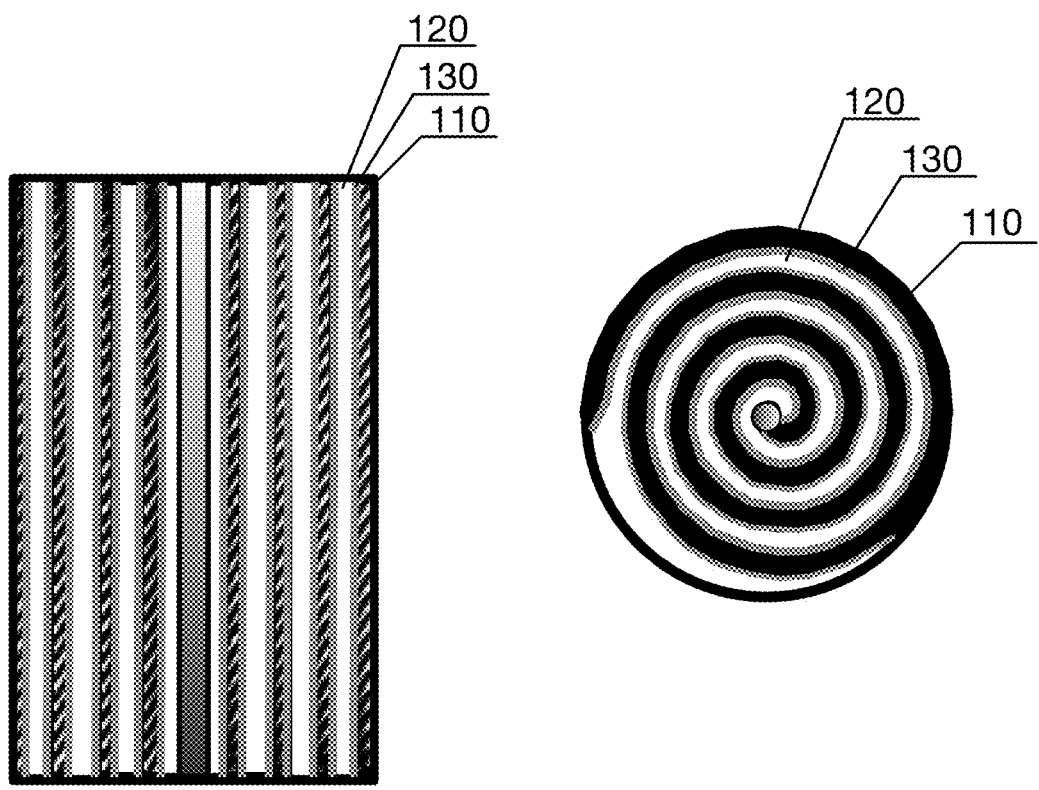
FIG. 4 is a second schematic representation of a cylindrical cell of a preferred embodiment.

In some variations, the anode 110, the cathode 120, and the separator 130 form three layers that can be wound together in concentric layers. In one example, the three layers may form concentric circles forming a cylinder, as shown in FIG. 3. In some other variations, there may be two separator layers, and the four layers (anode 110, cathode 120, and two separator layers) may be wound in a spiral formation with interlacing cathode and anode layers. In one example, as shown in FIG. 4 the four layers may form a cylinder in spiraling circles, effectively creating multiple interlacing layers of cathodes 120 and anodes 110. Both these variations may be used in implementations to create common cylindrical format batteries, such as 18650-type and 21700-type batteries. Cylindrical format batteries may be created using any other type of desired internal geometries. For example, six layers of concentric circles, two of each, may be used to create the cylinder geometry.

In alternative preferred examples, both the three-layer and four-layer variations may be wound in a rounded rectangle cell, as in a prismatic cell. These prismatic cell examples may be implemented as rectangular batteries, modular battery blocks or cells, and pouch cells.

Figure 5:
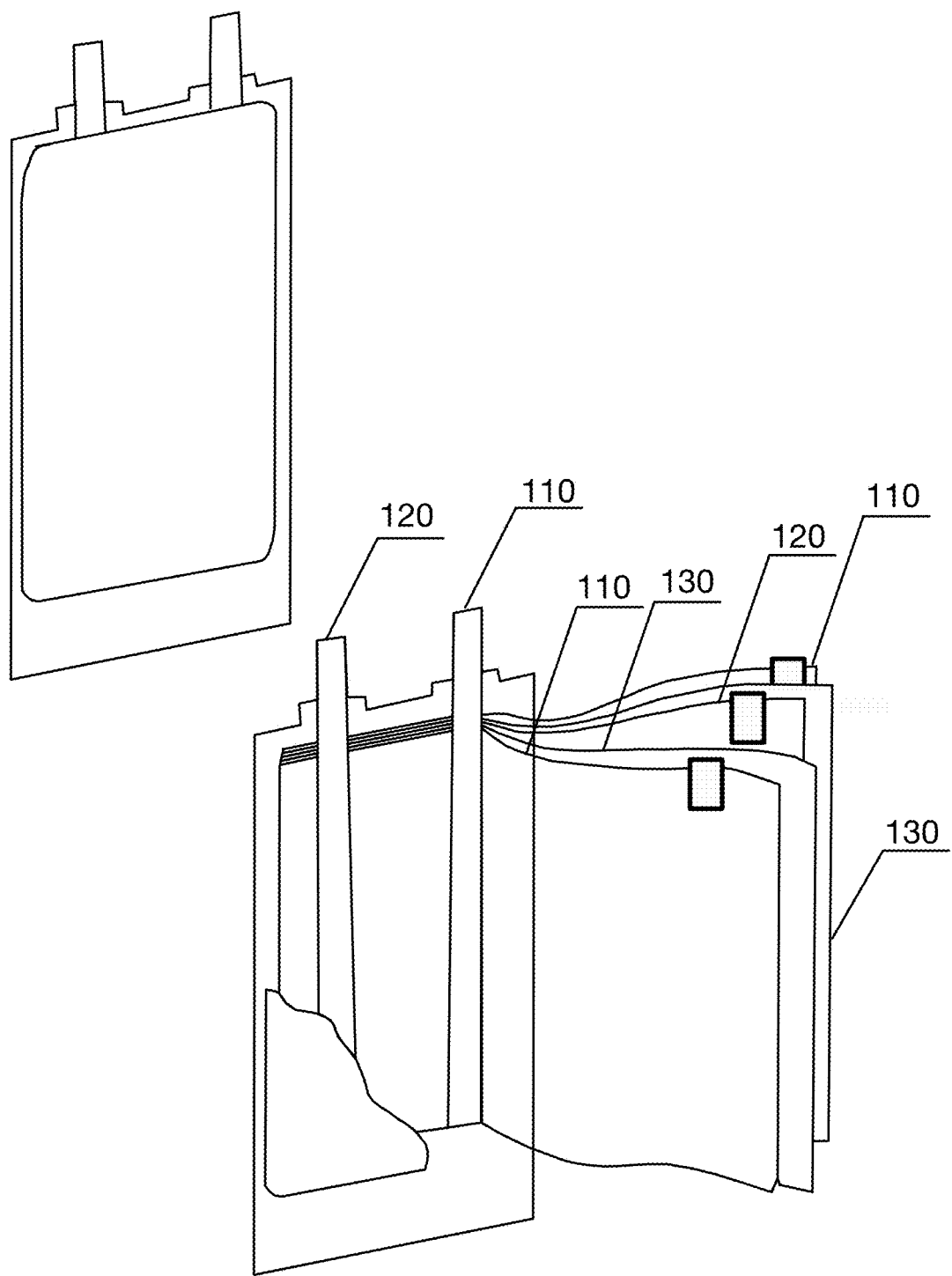
FIG. 5 is a schematic representation of a pouch cell of a preferred embodiment.

In another variation, the anode 110, the cathode 120, and the separator 130, may be cut and stacked one on top of each other as in a pouch cell. FIG. 5 shows a schematic representation of pouch geometry of a preferred embodiment. In one example, punched and stacked anode 110 and cathode 120 pieces may be placed between a "z-folded" separator, or punched and stacked cathode pieces placed between a z-folded separator and anode. The present system can be made in any format in which a traditional lithium ion chemistry can be made.

The system of a preferred embodiment includes at least one anode 110. The anode 110 is preferably an electrode (i.e., the negative electrode) through which conventional current enters the cell during the discharging process. Accordingly, during discharging, the conventional current (positive charge) exits the positive electrode (the cathode).

As one knowledgeable in the art can appreciate, electrochemically, the definitions of cathode and anode change sides depending on when you charge or discharge the battery. In preferred variations, the system includes at least one anode 110, wherein the number, shape, composition and other properties of each anode is dependent on the system implementation. Some examples of anode 110 geometries include: cylindrical "wire(s)", hollow cylinders and flat sheets, as described above. In preferred embodiments, each anode 110 is preferably embedded, at least partially, within the electrolyte system 140 and physically isolated from all cathodes 120 by the at least one separator 130.

In some preferred implementations, the anode 110 may be mounted, formed or bonded to a substrate as desired (e.g. the anode may be mounted on a current collector substrate). As exemplary implementations, a lithium metal or lithium alloy anode can be mounted or formed in situ on a current collector. In situ formation occurs when the system is assembled with a bare current collector and the lithium metal or lithium alloy anode is plated on the current collector upon first charging the battery. The lithium ions intercalated in the cathode 120 plate with or without alloying metals contained in the electrolyte onto the current collector, thus forming the anode 110 in situ. In preferred implementations, the current collector is a metal foil or a metalized plastic film. In one implementation, the current collector is copper metal or a copperized plastic film, preferably 3-30 μm in thickness. In alternative preferred implementations, the anode 110 is "freestanding" and not bound to a substrate (e.g. as lithium metal sheets in a pouch implementation). As a freestanding metal sheet (also referred to as metallic foil) the anode may vary from 5 to 80 μm in thickness. As exemplary implementations, this metallic foil variation may be freestanding lithium metal, or freestanding lithium metal alloy (preferred Li—Mg, other options include Li—Ag, Li—Zn, Li—Sn, Li—Si, etc.). As another alternative variation, the anode 110 may comprise intercalated material, preferably 5-300 μm thickness. In some implementations, the intercalation material could comprise graphite or silicon. For the pouch geometry, freestanding anode 110 sheets may be welded directly to tabs that carry current into the anode terminals from outside. The tabs are typically welded to and make electrical contact with each electrode. The tabs collect the current from every electrode and connect them through the cell casing to an external load. In preferable variations, the anode tabs comprise nickel.

In some preferred variations, the anode 110 is a metal anode. More preferably, the anode 110 is a lithium based anode. In one preferred example, the lithium based anode 110 is a lithium metal anode; also referred to as Li anode or Li metal anode). Li anodes 110 may have a high theoretical specific capacity (e.g., at or around 3860 mA h/g), low density (e.g., at or around 0.534 g/cm^3), and low negative electrochemical potential relative to a standard hydrogen electrode (e.g., at or around −3.040 V). The anode 110 may alternatively comprise another alkali metal (e.g. Sodium, Potassium) or alkaline earth metals (e.g. Beryllium, Magnesium, Calcium).

Figure 6:
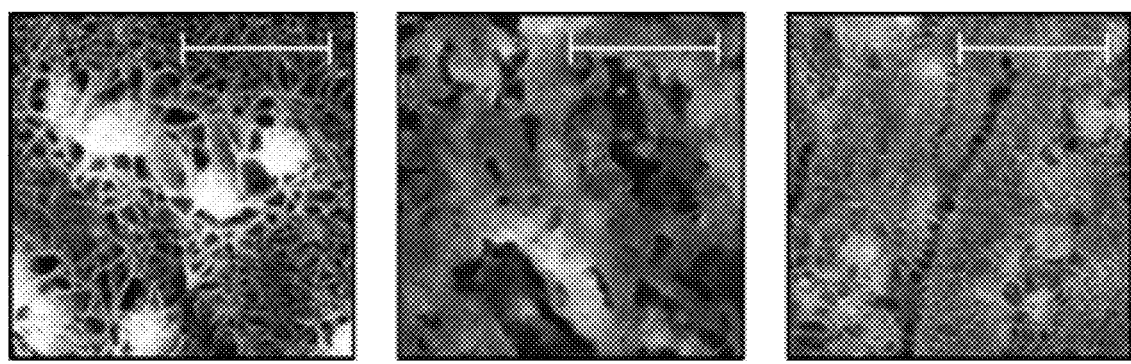
FIG. 6 shows image representations of micrographs of anode surfaces after a formation cycle of charge and discharge at 0.09 mA/cm^2 for lithium metal and lithium alloy anodes.

In another variation, the lithium based anode 110 is a lithium metal alloy anode; also referred to as Li-M anode for an unspecified alloy, wherein M serves as a metal compound placeholder and may be replaced by a specific alloy compound comprising one or more metals (e.g. Li—Al anode would refer to a lithium aluminum alloy anode). Li-M anodes may function to bring the high level lithium metal functionality (e.g. high energy density, low reductive potential) with improved battery cyclability. The Li-M anode 110 may accomplish this through improved efficiency and reversibility of the lithium plating, on the anode, by providing a chemical potential gradient which drives newly deposited lithium away from the anode surface and into the bulk thereby promoting a smoother surface-electrolyte interphase between the anode and electrolyte. FIG. 6 shows images from a scanning electron microscope (SEM) of the anode 110 surface after a formation cycle of charge and discharge at 0.09 mA/cm^2. From left to right, the anodes 110 are Li metal, Li—Mg alloy with 10 wt. % Mg, and Li—Mg alloy with 25 wt. % Mg. The scale bar represents 1 μm. The images may show that the Li—Mg alloy with 10 wt. % Mg, improves surface morphology the most. This may be at least partially due to a higher diffusion coefficient of lithium ions in lithium alloys as compared to lithium metal (e.g. at room temp. the diffusion coefficients of Li ion is ~$10.00 \times 10^{-8}$ cm$^2$/s in 10 wt. % Mg, Li—Mg and ~$1.00 \times 10^{-8}$ cm$^2$/s in Li metal). Examples of preferred metal (M) compounds of the Li-M include: Si, Al, Mg, Pb, Cd, Bi, As, Sn, Zn, and/or any combination of these metals. Alternatively, M may comprise another metal or metal compound.

Figure 7:
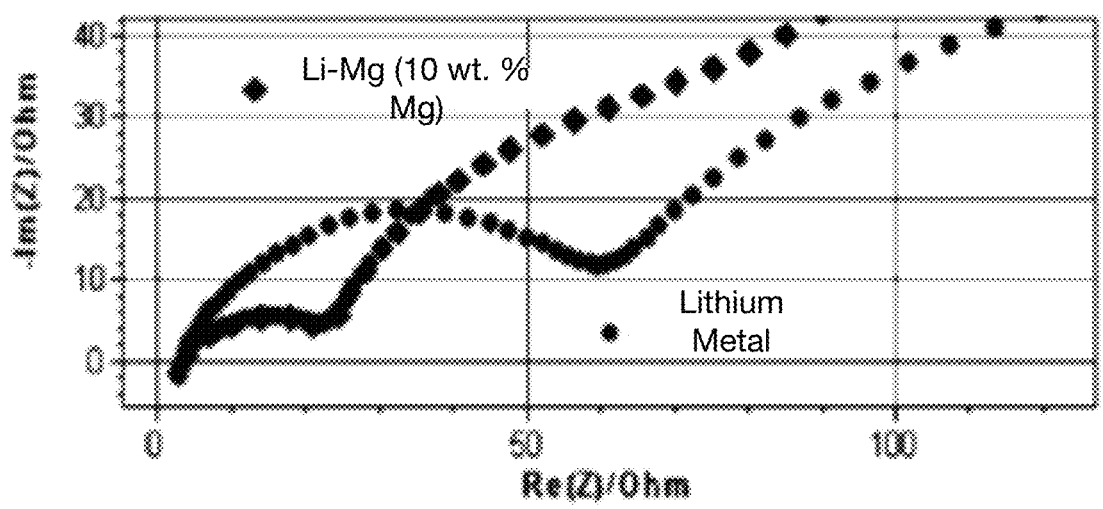
FIG. 7 is a Nyquist impedance plot for lithium metal and 10 wt. % Mg Li—Mg alloy anodes.
Figure 8:
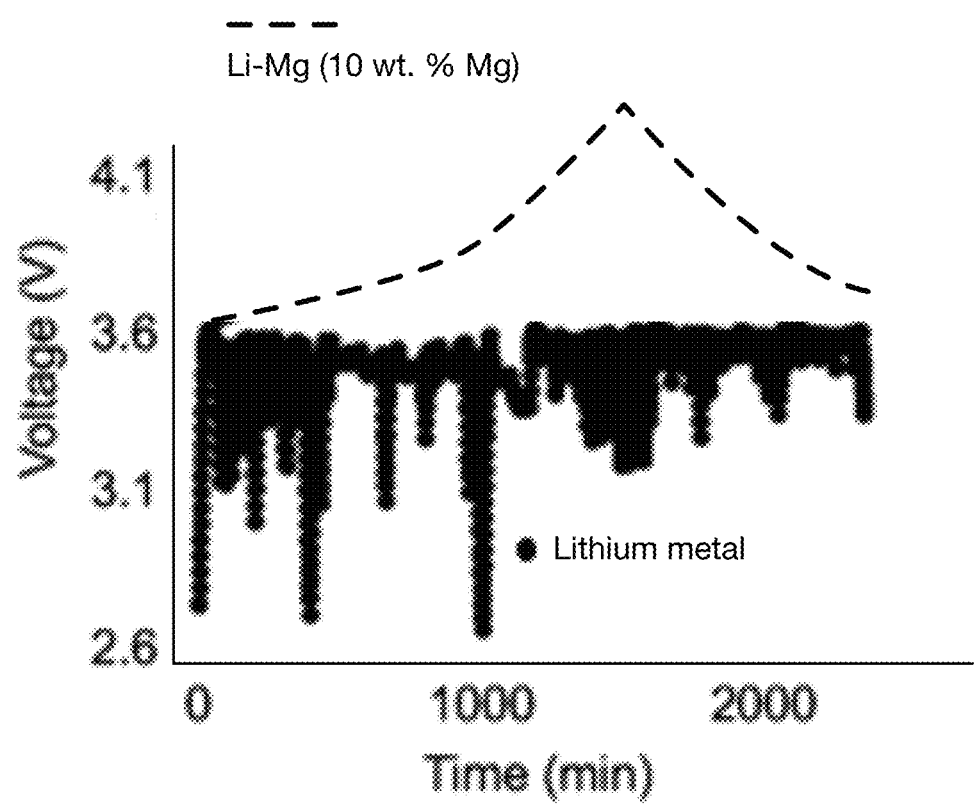
FIG. 8 is a plot of the first C/20 cycle of cells for lithium metal and 10 wt. % Mg Li—Mg alloy anodes.

In one preferred example the Li-M anode 110 is a Li—Mg anode (i.e. lithium magnesium alloy anode), wherein Li comprises 11-100 wt. % of the alloy. At room temperature, ~25° C., Li—Mg has a solid-solution phase yielding a large usable capacity range free from phase transitions. The Li—Mg anode may function to provide a reduced impedance. FIG. 7 shows Nyquist impedance plots of coin cells containing Li anodes and a coin cells containing Li—Mg anodes (10 wt. % Mg). Both cells underwent C/20 formation after a 44-hour resting period, at 25° C. The 10 wt. % Mg cells exhibited a 60% reduction in impedance. Additionally, FIG. 8 shows the first C/20 cycle of a cell built with a separator 130 comprising large pores ~1 μm for Li—Mg anodes (10 wt. % Mg.) and Li anodes. The difference may demonstrate the fundamental benefits of Li—Mg alloys for improving surface morphology. The alloy material percentage between the metal (Mg) and lithium can be made within a variety of ranges. In the case of a Li—Mg alloy, Mg may comprise 0.1-60% by weight of the Li—Mg alloy. Implemented versions of the system will preferably settle on a set percentage or a limited range of a percentage. In one preferred implementation, the lithium-magnesium alloy is one where magnesium comprises approximately 10% (e.g., 9-11%), by weight, of the lithium-magnesium alloy. In one preferred implementation, the lithium-magnesium alloy is one where magnesium comprises approximately 5% (e.g., 3-7%), by weight, of the lithium-magnesium alloy. However, alternative variations may have magnesium weight percentage with any suitable range in at least the ranges of 0.1-60% (e.g., magnesium comprising 0.1-5%, 5-10%, 10-15%, 15-20%, 20-25%, 25-30%, 30-35%, 35-40%, 40-45%, 45-50%, 50-55%, 55-60%, and/or other suitable ranges such as 2.5-7.5%.)

The system of a preferred embodiment includes at least one cathode 120. The cathode 120 is preferably an electrode through which conventional current leaves the cell during the discharging process. In preferred variations, the system includes at least one cathode 120, wherein the number, shape, physical composition, and other properties of each cathode are dependent on the system implementation. Some examples of cathode 120 geometries include: cylindrical "wires", hollow cylinders, and flat sheets, as described above. In preferred embodiments, each cathode 120 is preferably embedded, at least partially, within the electrolyte system 140 and physically isolated from all anodes 110 by at least one separator 130. In some variations, each cathode 120 may have a distinct separator 130, as shown in FIG. 5, while other variations a single separator, or another number of separators may separate the cathode and the anode 110.

In some preferred variations, the cathode 120 is a metal oxide cathode. Metal oxide preferably improves efficiency and functionality of the cell (e.g. by increasing the specific capacity). A metal oxide cathode 120 is preferably constructed by coating a mixture of metal oxide active material, polymeric binder and conductive additives onto a current collector. Examples of the metal oxide active material may be a lithium rich, or nickel rich alloy. Additionally, metal oxide doping may improve ionic mobility and conductivity. Examples of metal-oxide cathodes include: NMC (111, 532, 622, 811; the number indicates the molar ratio of Ni, Mn and Co in the chemical formula $LiNi_xMn_yCo_zO_2$ where x+y+z=1. For NMC811, Ni:Mn:Co is 8:1:1, hence the chemical formula $LiNi_{0.8}Mn_{0.1}Co_{0.1}O_2$), LCO ($LiCoO_2$), LFP ($LiFePO_4$), and NCA ($LiNi_{0.8}Co_{0.15}Al_{0.05}O_2$ and other varied compositions). Preferably, the metal-oxide cathode has a mass loading range between 5-18 $mg/cm^2$, although it may have a mass loading outside of this range. Preferably, the metal-oxide cathode has a density range between 2.4-3.5 $g/cm^3$, although it may have a density beyond this range.

The system preferably includes at least one separator 130. The separator 130, of a preferred embodiment, functions to physically and electrically separate anodes 110 and cathodes 120. Additionally the separator 130 functions as an ionically conductive membrane that conveys the electrolyte throughout the battery cell (e.g. enhanced with the use of a wetting agent). The separator 130 is preferably a thin porous material (e.g. 1-50 microns in thickness) with a porosity of 20-60%, as desired. The separator 130 may be composed of carbon-based polymer chains (e.g. polyethylene, polypropylene) with or without inorganic compounds (e.g. aluminum oxide, titanium oxide) for reinforcement. Dependent on implementation, the system may include one, or multiple, separators 130 to isolate the anodes 110 from the cathodes 120. Each separator 130 may have the same or distinct geometry as required by the implementation.

Implementations of the separator 130 can be 1 to 50 μm in thickness, have a pore size <350 nm; and a porosity >35%. The separator may be a bare membrane. In some preferred variations, the separator 130 is a polyolefin separator. Examples of polyolefin include polyethylene (PE), and polypropylene (PP). Polyolefin is a synthetic polymeric material that adds strength and durability to the separator 130. Polyethylene can have a simple linear structure with repeating units. Polypropylene can have a three-dimensional structure with a backbone of carbon atoms. In one variation, the polyolefin separator 130 is composed of just polyethylene. In another variation, the polyolefin separator 130 is composed of polypropylene. In a third variation, the polyolefin separator 130 is another polyolefin. In a fourth variation, the polyolefin separator 130 is composed of multiple polyolefin materials. In a fifth variation, the system has a non-polyolefin separator 130. Examples of non-polyolefin separator materials include: cellulose, polyimide, polyethylene terephthalate (PET), and glass material. In some variations, the separator 130 may include a coating of or be layered with other material, e.g. ceramics, surfactant, and/or polymer with or without inorganic fillers.

Figure 9:
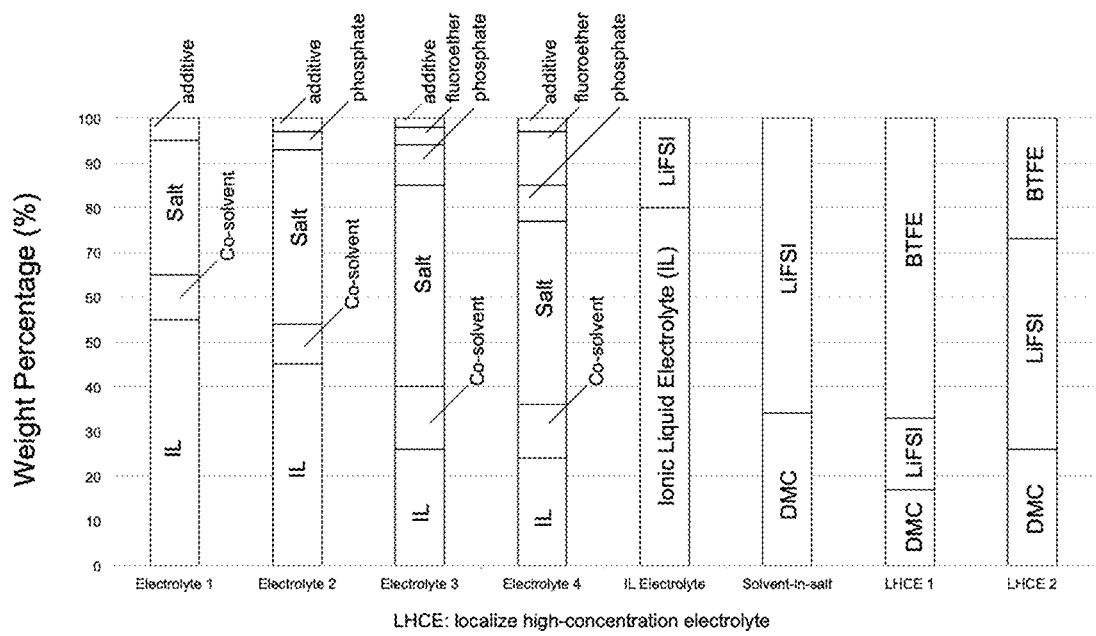
FIG. 9 shows electrolyte systems 1 through 4 of a preferred embodiment, in comparison with other non-embodiment prior art electrolytes.

The electrolyte system 140 of a preferred embodiment functions as the ionic charge carrier (i.e. medium) for the system. The electrolyte system 140 allows the conduction of ions through the separator 130 and in between/within the electrodes. The electrolyte system 140 is composed of an ionic liquid solvent combined with a minority-fraction ether co-solvent, and dissolved lithium salts. The electrolyte system 140 may additionally include wetting agents and/or additional additives. FIG. 9 shows several electrolyte systems of a preferred embodiment (electrolyte systems including a co-solvent) with relative ratios of different constituencies as indicated in electrolyte 1, electrolyte 2, electrolyte 3, and electrolyte 4 in comparison to other electrolytes: an IL electrolyte, a solvent in salt electrolyte, LHCE 1, and LHCE 2.

To improve the stability and reduce potential safety hazards of high energy density cells without compromising the system performance, the electrolyte system 140 is preferably chemically and electrochemically stable against both the anode 110 and cathode 120; thermally stable; forms a protective solid electrolyte interphase; and facilitates uniform stripping and deposition of lithium. The electrolyte system 140 may include any and/or all desired additives to improve and/or give new functionality. Dependent on the subcomponents, the electrolyte system may have a wide range of viscosities. In preferred variations, the electrolyte system has a viscosity ranging between 1-250 centipoise (cP).

In preferred variations, the electrolyte system 140 includes ionic liquid solvents. Ionic liquids are implemented as a solvent for use in electrolytes for high energy density lithium metal cells. Ionic liquids have excellent chemical and electrochemical stability. Electrochemical stability enables lithium metal to be reversibly plated to and stripped from the anode 110 with minimal electrolyte consumption when "fresh" lithium is exposed to the electrolyte. It may also enable the reversible high-voltage (up to 4.6 V vs. Li/Li+) cycling of NMC, LCO, and NCA, with minimal transition metal dissolution, surface structure reorganization, and oxidative electrolyte decomposition. The superior safety aspect of the ionic liquid electrolytes due to their non-flammable nature improves the abuse tolerance and thermal stability of the battery cell. Ionic liquids may comprise 5-75%, by weight, of the electrolyte system 140. Examples of preferred ionic liquids include: propyl-methyl-pyrrolidinium-FSI/TFSI; butyl-methyl-pyrrolidinium-FSI/TFSI; octyl-methyl-pyrrolidinium-FSI/TFSI and any combination thereof.

Figure 10:
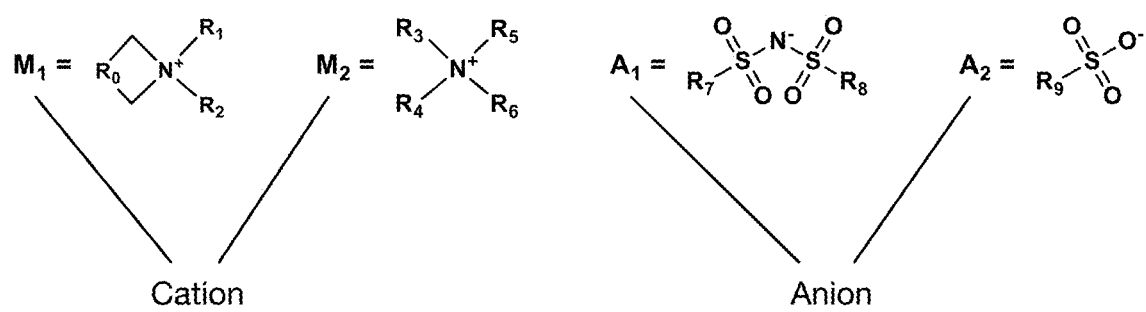
FIG. 10 is a list of generic chemical structures of cations and anions for the ionic liquid solvent of a preferred embodiment.
Figure 11:
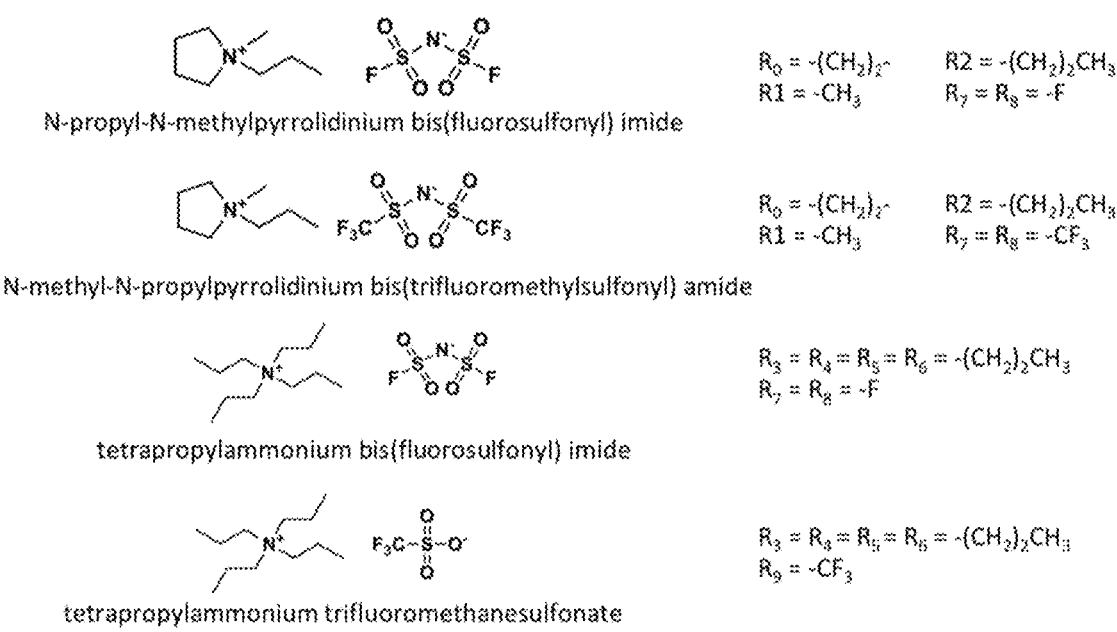
FIG. 11 shows examples of ionic liquids.

The type of ionic liquid may be changed dependent on desired implementation. There are many ionic liquids that could be considered for an ionic-liquid based electrolyte for lithium metal cells. The choice of ionic liquid solvent is preferably chosen based on cation and anion with high reductive stability (for compatibility with lithium metal) and oxidative stability (for compatibility with high voltage cathodes 120), with melting point below 25 degrees Celsius for low-temperature operation. The ionic liquid solvent should be capable of dissolving large quantities of lithium salts. As shown in FIG. 10 ionic liquids (IL) may be based on the molecular formula, $M_iA_j$, wherein the example chemical formulas for $M_i$ and $A_j$ are given for preferred variations; wherein $M_i$ are example cations and $A_j$ are a list of anions. $R_0$, $R_1$, $R_2$, $R_3$, $R_4$, $R_5$, and $R_6$ may be independently substituted for $C_{1-10}$ alkyl-substituted, and independently containing heteroatoms selected, but not limited to, N, O, S and F; $R_7$, $R_8$, and $R_9$ may be independently hydrogen-substituted, halogen-substituted, $C_{1-10}$ alkyl-substituted, and optionally containing heteroatoms selected, but not limited to, N, O, S and F. Examples of ionic liquids, as shown in FIG. 11 include:

Example IL-1: N-propyl-N-methylpyrrolidinium bis(fluorosulfonyl)imide, where according to formula ($M_1A_1$), $R_0$=—$(CH_2)_2$—, $R_1$=—$CH_3$, $R_2$=—$(CH_2)_2CH_3$, $R_7$=$R_8$=—F.

Example IL-2: N-methyl-N-propylpyrrolidinium bis(trifluoromethylsulfonyl)amide, where according to formula ($M_1A_1$), $R_0$=—$(CH_2)_2$—, $R_1$=—$CH_3$, $R_2$=—$(CH_2)_2CH_3$, $R_7$=$R_8$=—$CF_3$.

Example IL-3: tetrapropylammonium bis(fluorosulfonyl)imide, where according to formula ($M_2A_1$), $R_3$=$R_4$=$R_5$=$R_6$=—$(CH_2)_2CH_3$, $R_7$=$R_8$=—$CF_3$.

Example IL-4: tetrapropylammonium trifluoromethanesulfonate, where according to formula ($M_2A_2$), $R_3$=$R_4$=$R_5$=$R_6$=—$(CH_2)_2CH_3$, $R_9$=—$CF_3$.

The electrolyte system 140 preferably includes a lithium solute, i.e. lithium salt. The choice of lithium salt in the electrolyte system 140 has a large impact on lithium ion transport. In preferred variations, the lithium salt is chosen to have high dissociation in the electrolyte. The lithium salt preferably comprises 20-50%, by weight, of the electrolyte system 140. That is, lithium salts containing small, mobile anions are preferred in order to facilitate rapid lithium ion diffusion. The electrolyte system 140 may contain lithium bis(fluorosulfonyl)imide (LiFSI), lithium bis(trifluoromethylsulfonyl)amide (LiTFSI), lithium tetrafluoroborate (LiBF$_4$), lithium hexafluorophosphate (LiPF$_6$), lithium bis(oxalato)borate (LiBOB), lithium difluoro(oxalato)borate (LiDFOB), lithium trifluoromethanesulfonate (LiTf), lithium nitrate LiNO$_3$. More preferably, the lithium salt is LiFSI or LiTFSI, and most preferably LiFSI. Other suitable lithium salt variations may alternatively be used.

The electrolyte system 140 preferably includes a co-solvent. The co-solvent preferably comprises a minority fraction of the solvent, by weight. In preferred variations, the co-solvent comprises 5-40%, by weight, of the electrolyte system 140. In some preferred variations, the electrolyte system 140 can include multiple co-solvents. The co-solvent is preferably an ether co-solvent. The co-solvent may function to improve lithium ion mobility over the ionic liquid solvent by itself. In preferred variations, the co-solvent is added in high enough proportion to yield a considerable improvement in lithium ion mobility compared to that of a pure ionic liquid solvent electrolyte system alone.—while remaining in low enough proportion to not compromise the thermal stability, flammability, and electrochemical stability of the electrolyte.

Figure 12:
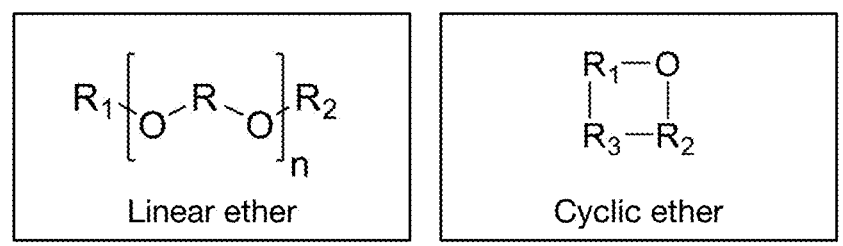
FIG. 12 shows the generic chemical structures of linear and cyclic ethers.
Figure 13:
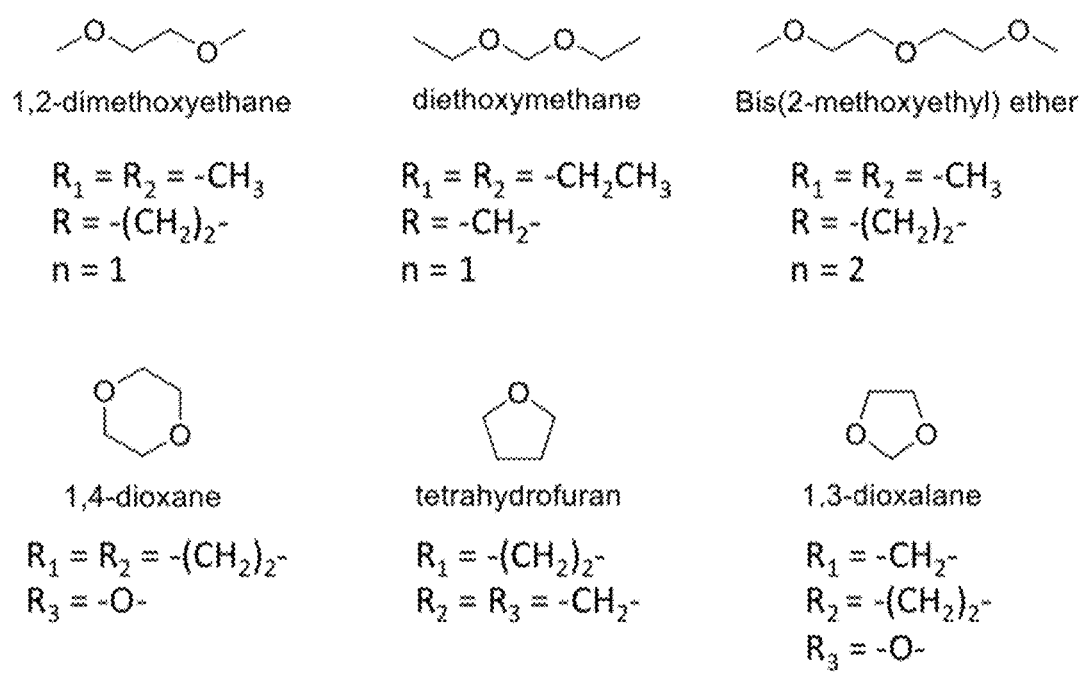
FIG. 13 shows examples of ethers.

The co-solvent is preferably of the ether class. Ethers may be reductively stable and enable reversible lithium metal plating and stripping. The co-solvent may be a cyclic ether, such as 1,3-dioxane (DOL), 1,4-dioxane (DX), or tetrahydrofuran (THF). FIG. 12 shows the general structure of cyclic and linear ethers and FIG. 13 shows examples of cyclic and linear ethers. The co-solvent is more preferably a linear ether, such as dimethoxyethane (DME), Bis(2-methoxyethyl) ether (G2), Triethylene glycol dimethyl ether (G3), or Tetraethylene glycol dimethyl ether (G4), Bis(2,2,2-trifluoroethyl)ether (BTFE); Ethylal; 1,1,2,2-Tetrafluoroethyl 2,2,3,3-tetrafluoropropyl ether (TFPE), and combination thereof.

In addition to the mentioned prior benefits, the combination of ether co-solvent and appropriate lithium salt dramatically improves the Li$^+$ transport performance at ambient and at low temperatures (down to −20 C), relative to an ionic-liquid-based electrolyte without either the co-solvent or the appropriate Li-salts. This allows for the stable operation of the cell with high energy density even at very low temperatures, without the flammability concerns of typical electrolytes designed for low-temperature operation.

As part of the function of the electrolyte system 140, almost all electrolyte components may reductively decompose with contact with bare lithium metal, leading to the formation of a solid-electrolyte-interphase (SEI) layer. The mechanical and chemical properties of the SEI have a significant effect on cell performance. A preferred SEI is electronically insulating, ionically conducting, and mechanically robust; yet flexible enough to accommodate volume change during lithium plating and stripping. Given the high reductive stability of the ionic liquid and the co-solvent, the chemical composition of the SEI is highly dependent on the choice of lithium salt. A preferred salt combines an anion whose reduction-decomposition products (e.g. LiF for some of the fluorinated anions) are electronically insulating yet lithium-ion conducting, with a co-solvent whose reduction-decomposition products are flexible polymers, which bind together the inorganic species and imbue the SEI with flexibility.

In variations that include a Li-M anode 110, the electrolyte system 140 may additionally or alternatively include metal M salts. As detailed in the methods section, the Li-M anode may be formed in situ by a spontaneous and/or electrochemical alloying reaction between an anode 110 electrode and an electrolyte system 140 containing M salts and/or an existing Li-M anode may be modified, in situ, by a spontaneous and/or electrochemical alloying reaction between the existing Li-M anode and the electrolyte containing metal M salts. Thus, the metallic salts may function as alloying material to form and/or resurface the Li-M anode. The metallic salts may contain bis(trifluoromethanesulfonyl)imide ("TFSI"), bis(fluorosulfonyl)imide ("FSI"), hexafluorophosphate ("PF$_6$"), tetrafluoroborate ("BF$_4$"), and/or bis(oxalate)borate ("BOB") anions, or any other suitable anion, or some combination thereof. The metallic salts may be blended, to produce a Li-M alloy anode with various compositions of distinct metals. This fine-tuning allows the tailoring of the Li-M alloy anode to meet specific performance characteristics. It also allows the creation of alloys with specific compositions which may not be commercially available.

In many variations, the ether co-solvent may not generally be as electrochemically or thermally stable as the ionic liquid solvent. The stability can be increased by using a high concentration of lithium salts, such that the co-solvent is well coordinated by lithium ions. A solvent molecule will be well coordinated with Li$^+$ ions when there are enough Li$^+$ ions in solution to partially or fully surround it and hence electrostatically screen it from decomposition at the electrodes. High salt concentrations may also increase the surface concentration of lithium ions at the anode 110 during plating, which increases plating uniformity, lowers the plating overpotential, and reduces electrolyte decomposition. As a result of these considerations, moderate or high salt concentrations of >30 wt. % are preferred for some variations. Alternatively in one variation, the lithium salt solute may comprise 0.1-15 wt. %, by molarity, of the electrolyte system 140. In a second variation, the lithium salt solute may comprise 15-30 wt. %, by molarity, of the electrolyte system 140. In a third variation, the lithium salt solute may comprise 30-40 wt. %, by molarity, of the electrolyte system 140. In a fourth variation, the lithium salt solute may comprise 40-50 wt. %, by molarity, of the electrolyte system 140. Moderate to high Li-salt concentrations dramatically improve the oxidative stability of an electrolyte, as described above, based on ionic liquids blended with an ether co-solvent. This improved oxidative stability may dramatically extend cycle life when such an electrolyte is paired with a metal-oxide cathode 120, to produce a cell obtaining high energy density, as described above.

In some variations, the electrolyte system 140 may additionally include additives. Additives can preferably address one or more challenges of the system by including additives; e.g. sluggish lithium ion conductivity of the electrolytes may be improved through an additive. In one preferred variation, the system may address the slowing of ion transport that may result from ionic liquids being highly viscous compared to the volatile organic solvents used in traditional lithium-ion cells. As another potential challenge that may be addressed by the system, the lithium ions from dissolved lithium salts generally comprise only a minor fraction of the charge carriers in the solution. This leads to lower lithium-ion transference numbers compared to organic carbonate electrolytes, which leads to the formation of large concentration gradients across the cell and worsened charge/discharge rate capability. Some variations of the system may additionally or alternatively address such limited $Li^+$ transport issues as discussed herein.

In some preferred variations, the electrolyte system 140 may additionally include various wetting agents. Wetting agents may or may not be considered as additives with no effect or limits on the functionality of the wetting agent. In preferable variations, wetting agents comprise 0.5-50%, by weight, of the electrolyte system 140. The wetting agent may function by reducing the viscosity and polarity of the electrolyte, thus lowering wetting times and improving interfacial compatibility with the separator 130, respectively. The system may include a single wetting agent, multiple wetting agents, or no wetting agents. In some variations, the above mentioned co-solvent may function as one wetting agent. Other wetting agents with either low viscosity or low polarity may be used, such as linear or cyclic ethers, fluorinated ethers, etc.

Wetting agents may dramatically improve the ability of the electrolyte system 140 to properly wet the cell components, especially the polyolefin separator 130. The wetting agent may reduce the time needed for cell wetting and formation. The wetting agent may also improve the ability for excess electrolyte, which may be included in the cell, to wick into a stack and replenish consumed electrolyte to extend cycle life. The benefit of wetting agents increases as cell size is increased (both planar dimension and stack thickness. i.e. number of layers), as is needed to produce a cell obtaining high energy density, as described above. That is, a wetting agent is preferred for larger systems.

In some variations, the wetting agent may be a surfactant. A surfactant may be characterized as a compound that contains both polar components and non-polar components at the molecular level. Surfactants provide a more compatible interfacial layer between the non-polar separator 130 surface and the moderately polar electrolyte. Traditional surfactants may be ionic or non-ionic, and/or polymeric or oligomeric. Ionic surfactants may be cationic or anionic. Examples of surfactants that may be used include Triton X-100, 3M FC-4430, 3M FC-4432, Chemours Capstone FS-66, Chemours Capstone FS-3100, Pluronic L-35, F-68, Li-dodecylsulfate, and Silwet L-77.

Alternatively, the wetting agent may be another ionic liquid, wherein the ionic liquid is also a surfactant. The alkyl chain attached to the main ring of the cation can function with a hydrophobic element, improving compatibility with hydrophobic battery components such as the polyolefin separator 130.

Figure 15:
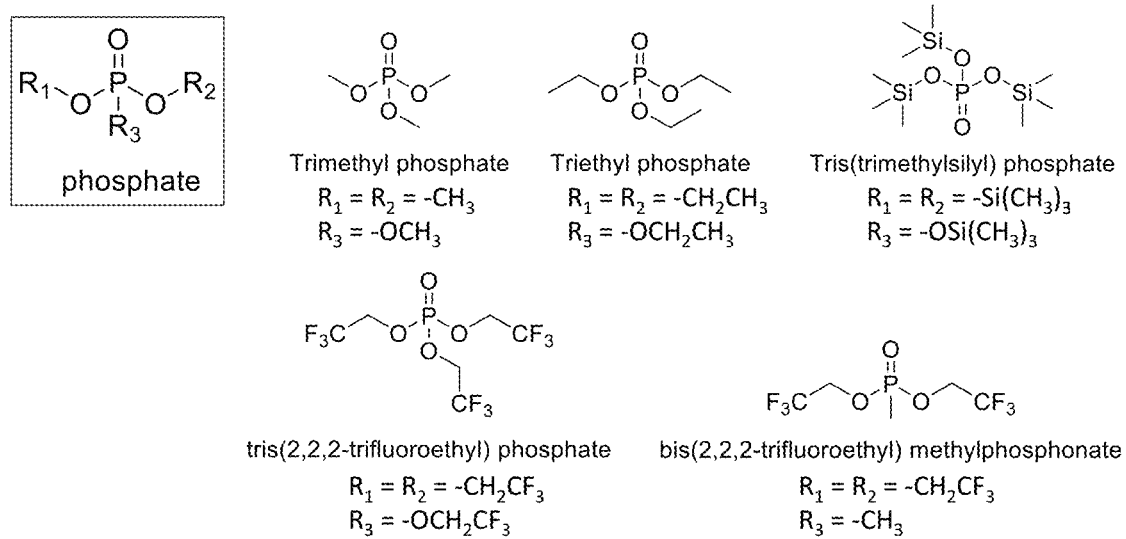
FIG. 15 shows a generic chemical structure and examples of phosphates.

In some variations, the wetting agent may further include a phosphate ester (e.g. $PO(OR)_3$) or phosphite compound (e.g. $P(OR)_3$). FIG. 15 shows examples of phosphate esters. Phosphate esters and phosphites are known to be flame retarding. Upon thermal decomposition, these wetting agents may generate phosphorus containing radicals that can scavenge and stop the propagation of the hydrogen or hydroxyl radical generated from combustion of common alkane-containing solvents. Additionally, the phosphate ester and/or phosphite co-solvent, depending on the specific functional group, may improve the wetting of the separator 130 and cathode 120 by reducing the viscosity and surface tension of the bulk electrolyte. Preferably, the phosphate ester and/or phosphite wetting agent may also improve the Li deposition morphology and electrolyte oxidation stability by forming a stable and high quality SEI on the cathode particle surface.

Figure 14:
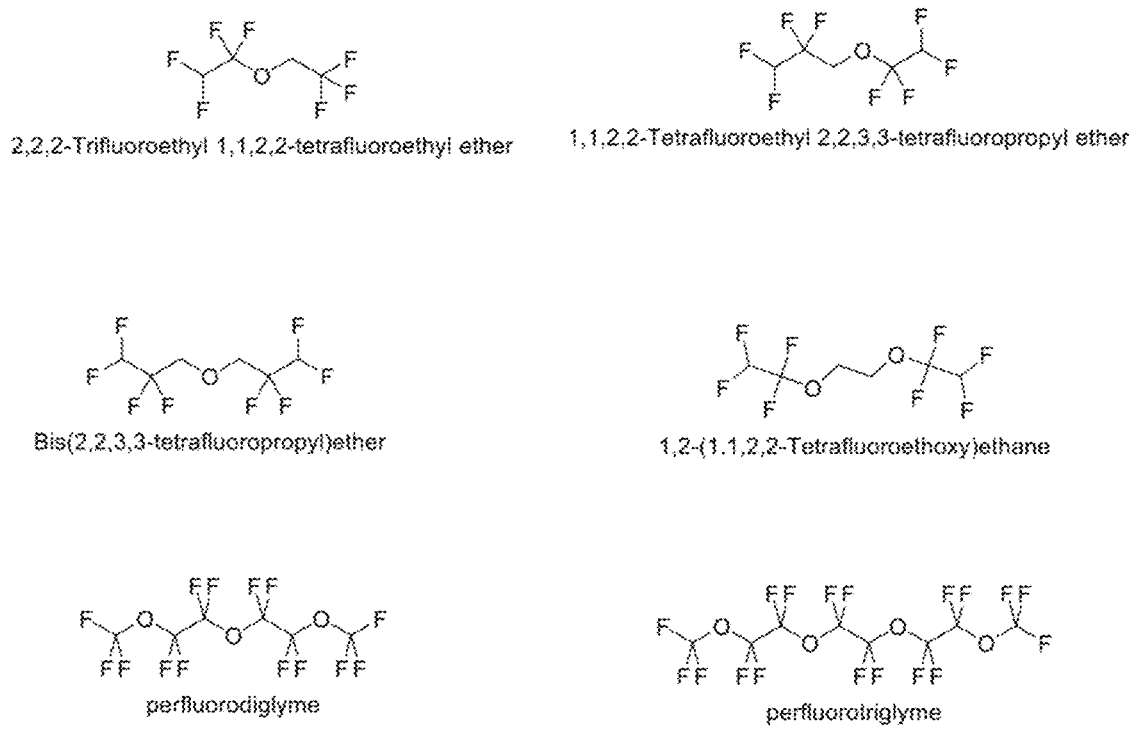
FIG. 14 shows examples of fluoroethers.

Alternatively, the wetting agent may additionally or alternatively be a fluorinated ether. FIG. 14 shows examples of fluorinated ethers. Fluorinated ethers may enable the formation of a more stable solid-electrolyte-interphase (SEI) on both the cathode and anode surface. Fluorinated ethers may be either fully or partially fluorinated. Additionally, the Coulombic efficiency of the battery may increase with the degree of fluorination.

Additives may additionally be a component of the electrolyte system 140. Typically additives are defined to be added in small relative concentrations, e.g. <10 wt. %, but may alternatively be added in greater relative concentrations. Additives may alter/improve any number of functionalities of the system (e.g. to further tune the chemical and/or physical properties of the SEI). Additives may be divided into various classes depending on their primary purpose, though some additives may be multi-functional. Some additives may be reductively unstable in contact with lithium metal and are designed to influence the chemistry of the SEI. Some additives may be designed to decompose on the cathode 120 surface to build a thin passivation layer that protects the electrolyte from further side reactions catalyzed by the reactive surface of the cathode 120. Some additives may be designed to break up solvent-solute interactions and improve the $Li^+$ transport properties of the electrolyte. Some additives may be designed to polymerize in contact with Li metal anode 110, producing a high-performance SEI component that prevents continuous side reactions between electrolyte 140 and Li anode 110. The electrolyte system may contain any combination of these categories of additives, including none at all.

3. Examples

Herein, examples and comparative examples are used to further elaborate the invention. The scope of this invention is not limited by the specifications and examples provided here.

Figure 16:
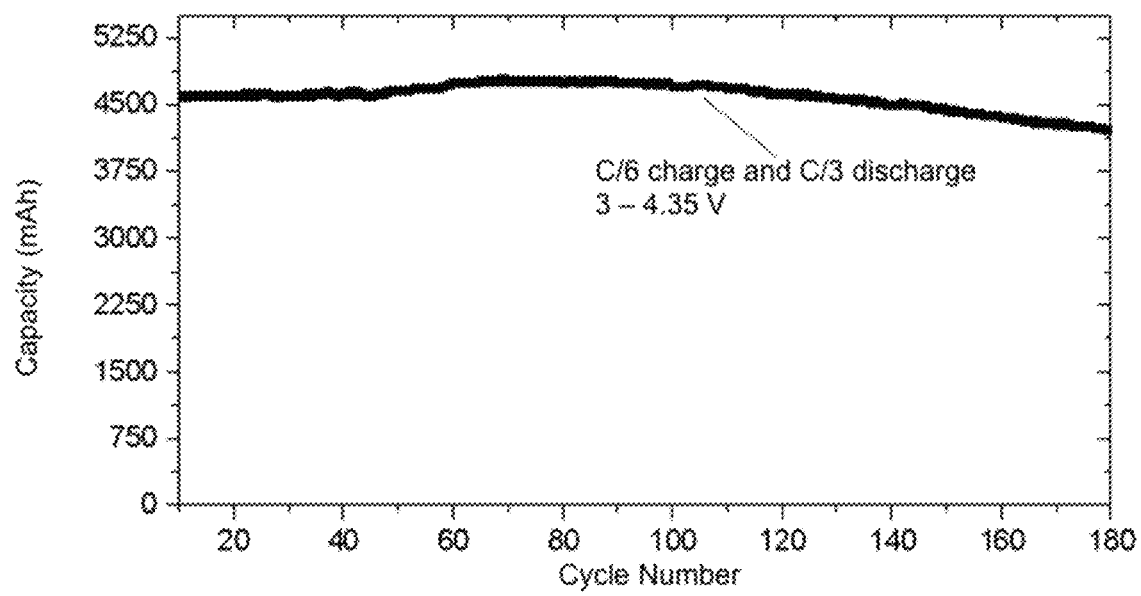
FIGS. 16-18 show cycling performance for 5 Ah pouch cells at different C-rates at 25° C.
Figure 17:
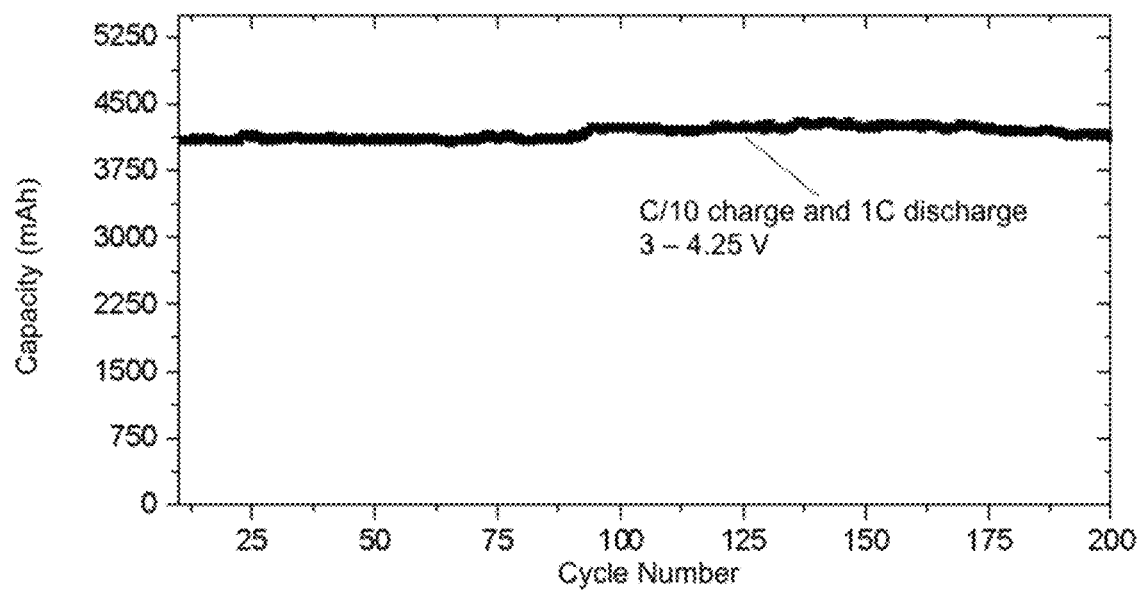
Figure 18:
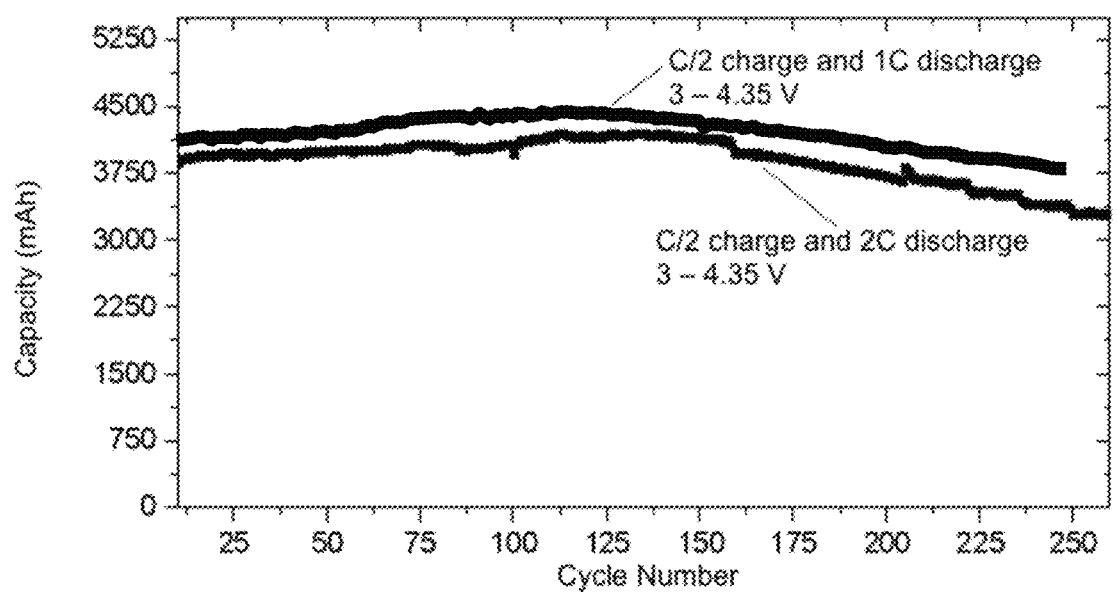
Figure 19:
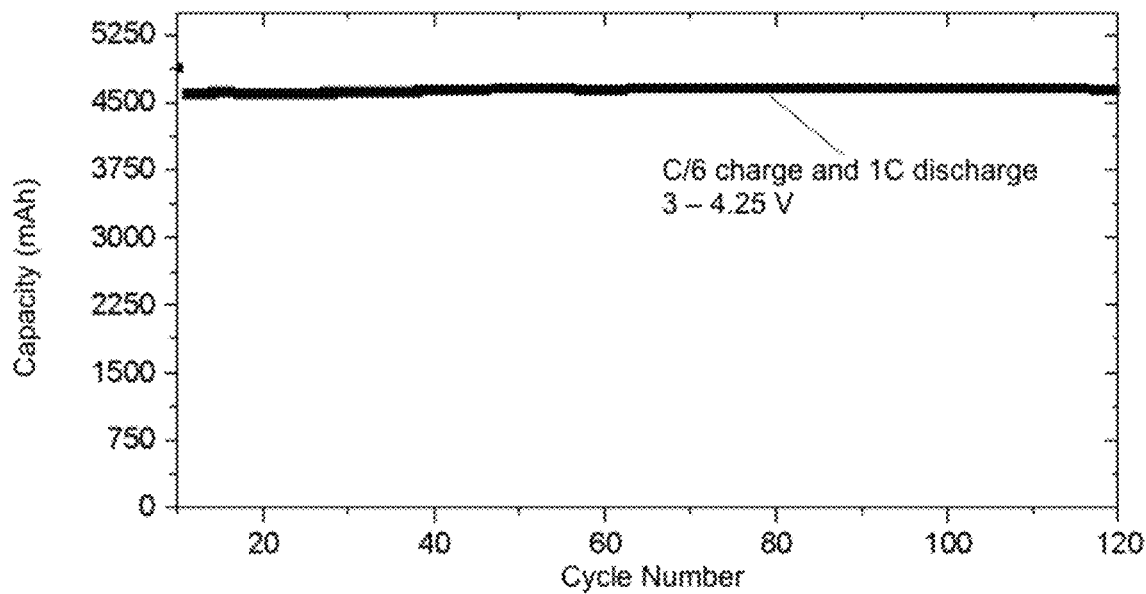
FIG. 19 shows cycling performance for 5 Ah pouch cells at 45° C.
Figure 20:
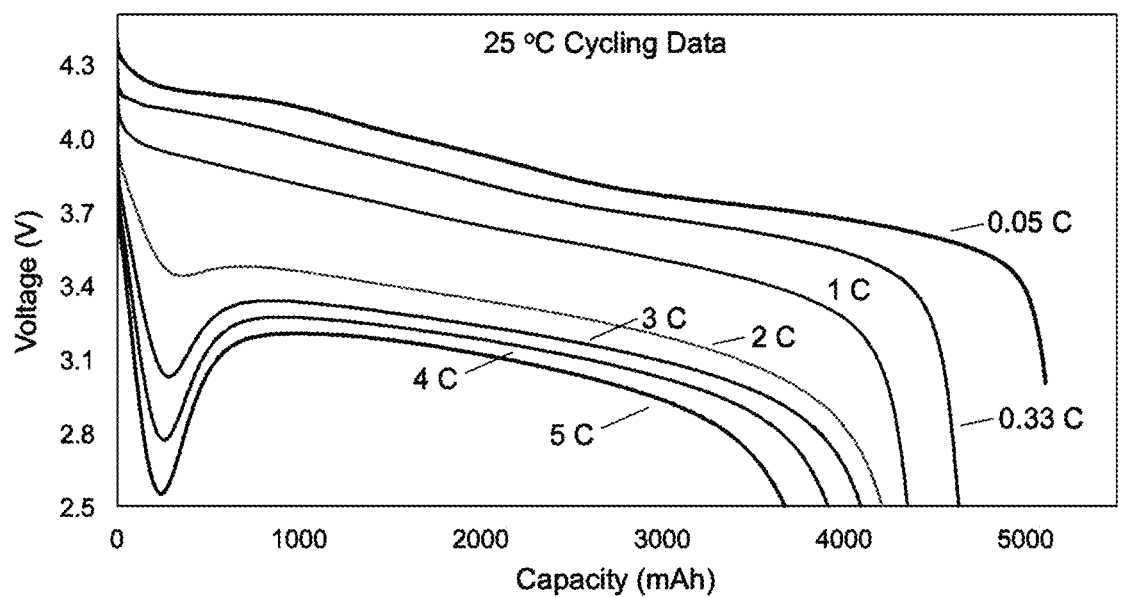
FIG. 20 shows plots of discharge curves from a pouch cell at 25 C.
Figure 21:
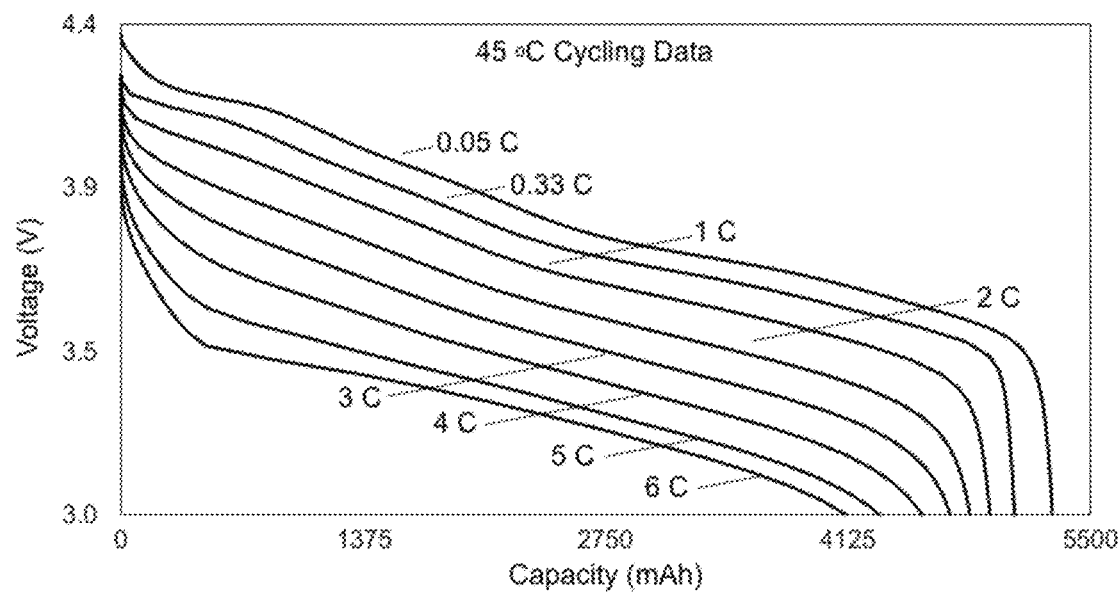
FIG. 21 shows plots of discharge curves from a pouch cell at 45 C.

Data for an example embodiment of this invention is presented in the figures. FIGS. 16-19 are examples of cycling performance data for different battery C-rates and temperatures for a 5 Ah pouch cell. FIG. 16 shows the cell cycled using a C/6 charge and C/3 discharge protocol at 25° C., FIG. 17 shows the cell cycled using a C/10 charge and 1 C discharge protocol at 25° C., FIG. 18 shows the cell cycled using a C/2 charge and 1 C and 2 C discharge protocols at 25° C., and FIG. 19 C/6 charge and 1 C discharge protocol at 45° C. FIG. 20 shows the discharge curves for different C-rates at 25° C. and FIG. 21 shows the discharge curves for different C-rates at 45° C.

In a first example, the anode 110 is freestanding lithium metal of 20 to 80 µm thickness, the cathode 120 is NMC811 of 5 to 18 mg/cm² single-sided active material loading, and the separator 130 is polyethylene of 5 to 30 µm thickness. The ionic liquid solvent is propyl-methyl-pyrrolidinium-FSI (PYR13FSI), with 9 wt. % to 12 wt. % dimethoxyethane (DME) as a minority-fraction co-solvent. The lithium salt is LiFSI with concentration between 25 wt. % to 40 wt. % LiFSI. Wetting is enhanced using small (<5 wt. %) amounts of methyl-pentyl-pyrrolidinium-TFSI (PYR15TFSI), and Silwet L-77 surfactant as wetting agents.

In a second example, the anode 110 is lithium metal of 50 µm thickness mounted on a copper current collector, the cathode 120 is NMC811 of 12 mg/cm² active material loading, and the separator 130 is polyethylene of 12 um thickness. The ionic liquid main solvent is propyl-methyl-pyrrolidinium-FSI (PYR13FSI), with 7 wt. % to 12 wt. % dimethoxyethane (DME) as a minority-fraction co-solvent. The lithium salt is a blend of LiFSI and LiTFSI with concentration between 25 wt. % to 30 wt. % LiTFSI and 6 wt. % to 8 wt. % LiFSI. Wetting is enhanced using triethyl phosphate and Bis(2,2,2-trifluoroethyl)ether as wetting agents.

In a third example, the anode 110 is lithium metal of 50 µm thickness mounted on a copper current collector, the cathode 120 is NMC811 of 12 mg/cm² active material loading, and the separator 130 is polyethylene of 12 um thickness. The ionic liquid solvent is propyl-methyl-pyrrolidinium-FSI (PYR13FSI), with 20 wt. % to 40 wt. % dimethoxyethane (DME) as a minority-fraction co-solvent. The lithium salt is LiFSI with concentration between 40 wt. % to 60 wt. % LiFSI.

In a fourth example, the anode 110 is freestanding lithium metal of 50 µm thickness, the cathode 120 is NMC811 of 12 mg/cm² active material loading, and the separator 130 is polyethylene of 12 um thickness. The ionic liquid solvent is propyl-methyl-pyrrolidinium-FSI (PYR13FSI), with 7 wt. % to 12 wt. % dimethoxyethane (DME) as a minority-fraction co-solvent. The lithium salt is LiFSI with concentration between 40 wt. % to 45 wt. % LiFSI. Wetting is enhanced using small (<5 wt. %) amounts of methyl-octyl-pyrrolidinium-TFSI (PYR18TFSI), and 3M FC-4430 surfactant as wetting agents.

3. Method

As shown in FIG. 22, a method for in situ lithium metal (Li-M) alloy formation preferably includes: adding a Li-M alloy salt to an electrolyte solution S110, exposing an anode base into the electrolyte solution S120, and driving the Li-M alloy salt onto the anode base S130. The method functions to produce a Li-M alloy anode through deposition of Li-M alloy material on an anode base through an induced overpotential. The method may be a standalone operation; for example, to create the anode of a battery or the anode for any generally implemented oxidation/reduction reaction (e.g. "factory" generation of a battery). Alternatively, the method may be part of the general operation of some cell system; for example, a "cell resting" phase, or battery charge/discharge phase (e.g. to refresh the surface-electrode interphase of a Li-M alloy anode, or to generate a Li-M alloy anode).

The method may be implemented to serve one of three general purposes, although it may be implemented for any desired purpose. i) Creating a Li-M alloy material: The method may be implemented for the creation of a Li-M alloy, preferably for implementation as an anode. Li-M alloy creation comprises in-situ alloy creation either on a base structure (e.g. anode base) or spontaneous Li-M alloy creation. ii) Refreshing a Li-M alloy material: As a Li-M alloy material may deplete over time (e.g. during battery operation), the method may enable replenishment of the Li-M alloy. iii) Creating and/or refreshing a surface-electrode interphase (SEI): The anode SEI of a battery plays a significant role in battery charging/discharging cycles. Through many cycles deformations of the SEI (e.g. dendritic formations) may occur that impair battery functionality. The method may be implemented to remove and/or reduce these deformations. It should be noted that these three general purposes are not necessarily distinct or separate ideas, but may refer to the same concept(s).

Dependent on implementation, the method is preferably a single use method for some systems, or a repeated method for the same or other systems. In preferred embodiments, the method is preferably utilized with a system as described above, but can be preferably implemented with any system, or subsystem, that includes an electrolyte that includes a Lithium salt; preferably the electrolyte further includes an ionic liquid solvent; preferably the electrolyte further includes an ether co-solvent; preferably the ether co-solvent is a minority fraction (by weight) of the solvent. As specific implementation of the method is very dependent on the exact system it is implemented with, a general overview of the method is presented, with general steps on how to use a set of system specifications to determine the exact method step.

Block S110, which includes adding a Li-M alloy salt to the electrolyte, functions to provide alloy material for the anode. The amount of Li-M alloy salt added to the electrolyte preferably varies on implementation. In preferred variations, the amount of Li-M alloy salt added corresponds to the desired final composition of the anode. Adding a Li-M alloy salt to the electrolyte S110 may occur concurrently with creating the electrolyte solution. Alternatively, block S110 may occur at any time after the creation of the electrolyte solution. In some variations adding a Li-M alloy salt to the electrolyte S110 may be part of the upkeep, thereby helping to restore the Li-M alloy anode, or the surface electrode interphase (SEI).

The alloy of the Li-M alloy may comprise lithium with one, or multiple, other metals or metal compounds. Examples of possible metals include: Si, Al, Mg, Sn, Pb, Cd, Bi, As, Zn. Dependent on the desired implementation, S110 preferably includes adding the appropriate salt of the desired metal alloy.

Block S120, which includes exposing an anode base to the electrolyte, functions to expose the anode base to the electrolyte solution. In variations, wherein the method is used for spontaneous anode formation, block S120 may be excluded from the method. In many variations, exposing the anode base to the electrolyte S120 is a single operation process that is done one time (e.g. at the point of time when a battery cell is created). In these variations the anode base may be continuously and/or permanently exposed to the electrolyte. In other variations, block S120 may need to be performed on the anode base for each implementation of the method. For example, a battery may have a system that contains modular cathode and anode components. As part of block S120, the base anode may be moved from a first battery case containing some electrolyte to a second battery case containing the desired electrolyte, thereby exposing the anode base to the electrolyte solution.

Block S130, which includes driving the Li-M alloy salt onto the anode base, functions to "grow" a Li-M alloy anode on the anode base (also referred to as alloying process). In preferred variations, block S130 comprises creating the appropriate thermodynamic and/or kinetic conditions to induce Li-M alloy anode growth.

Driving the Li-M alloy salt onto the anode base S130 may be dependent on the composition of the anode base, which may vary dependent on the system implemented with the method. The anode base type may be divided into three general groups: i) non-existent ii) a seed-type anode base, iii) lithium or Li-M alloy anode base.

In a first variation, the anode base is non-existent (e.g. in the initial creation of the anode). In this variation, driving the Li-M alloy salt onto the anode base S130 includes nucleation event(s) to generate the Li-M alloy anode. Thus block S130, includes creating the appropriate thermodynamic conditions such that nucleation of Li-M alloy material may occur spontaneously (e.g. spinodal decomposition). In this implementation, block S130 preferably includes altering the system thermodynamic conditions such that this type of nucleation may occur (e.g. changing temperature or pressure).

In a second variation, the anode base may comprise some general electrode material, such as copper current collector (e.g. this may be an implementation for the creation of a battery). For a copper current collector, or other general electrode material, driving the Li-M alloy salt onto the anode base S130 preferably includes creating appropriate thermodynamic conditions such that nucleation occurs along the electrode material. As the electrode material may serve as a nucleating "seed", the thermodynamic conditions may be less stringent as compared to the first example. In some implementations, the anode base may additionally be implanted with specific nucleation seeds/impurities. These seeds/impurities may further reduce the thermodynamic requirements for driving the Li-M alloy salt onto the anode base S130. Additionally or alternatively, these seeds may enable better organization of Li-M alloy growth on the anode base, both improving the Li-M alloy density and improving the SEI.

In a third variation, the anode base may be composed of a lithium metal or the desired lithium metal alloy (e.g. a premade alloy material, and/or in implementations to refresh a battery). In this variation, creating the appropriate thermodynamic conditions may be even less stringent. As the lithium metal or Li-M alloy material is in place, thermodynamic conditions that enable Li-M alloy salt to precipitate out of the electrolyte and deposit onto the anode base may be sufficient.

Driving the Li-M alloy salt onto the anode base S130 preferably includes kinetically driving the Li-M alloy salt onto the anode base. In preferred variations, kinetically driving the Li-M salt comprises inducing an electrical current, although other driving methods may be additionally or alternatively used (e.g. heat currents). Kinetically driving the Li-M salt onto the anode base may function to control the rate of Li-M alloy growth (e.g. to improve SEI formation, and speed up alloy formation) and help determine the region for Li-M alloy formation (e.g. during spontaneous alloy formation). Kinetically driving the Li-M salt onto the anode base S120 may include increasing or decreasing the current during the alloying process. In some variations, as Li-M alloy salt is depleted from the electrolyte as during the alloying process, the current may be increased to maintain a relatively constant over-potential. This may function to help form a smoother SEI. In another variation, the current may be significantly increased to induce complete depletion of Li-M alloy salt from the electrolyte prior to formation of the SEI.

Figure 23:
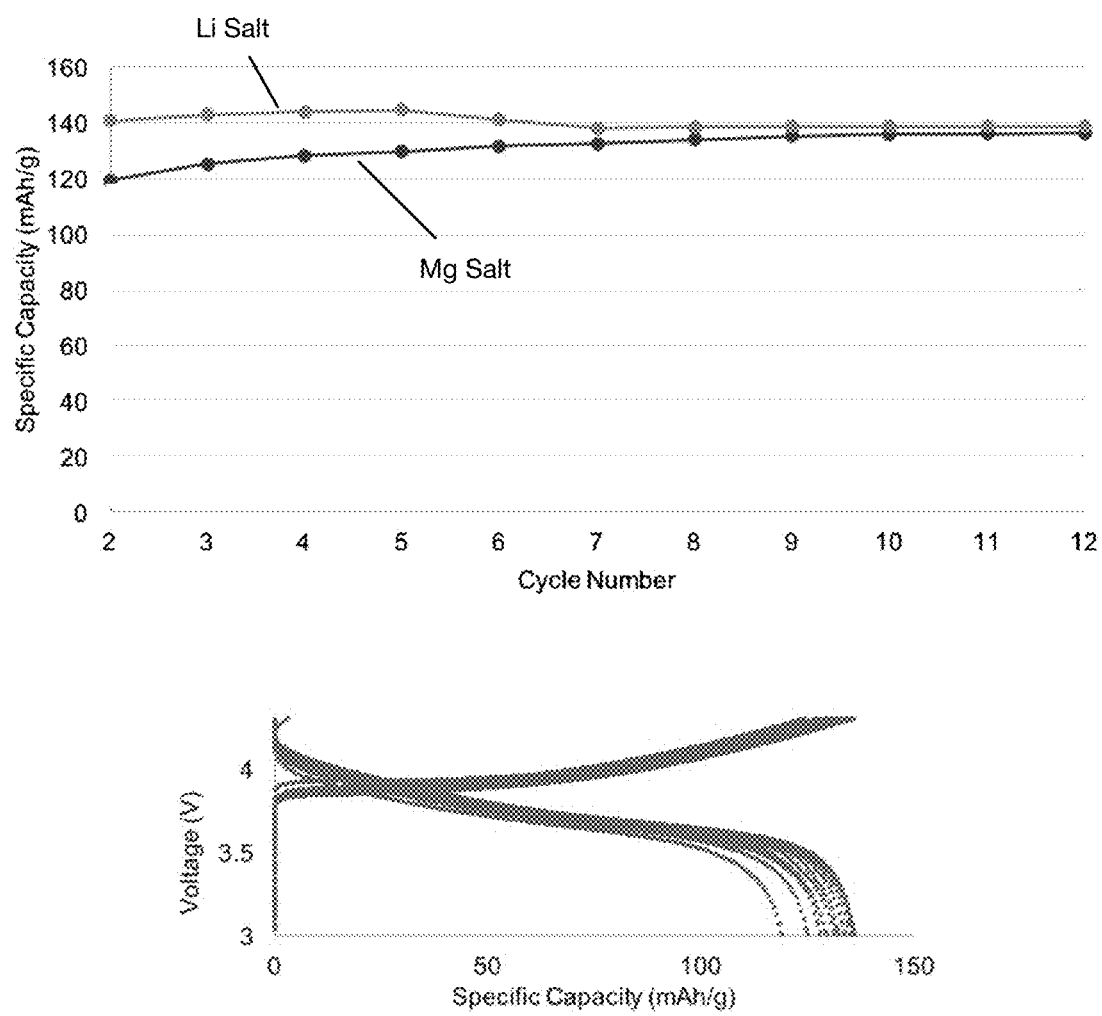
FIG. 23 is a plot of the C/4 cycling performance of a coin cell containing the electrolyte of a preferred embodiment with Mg salts completely replacing Li salts.

Experimental evidence for the utility and viability of spontaneous and electrochemical alloying is given in FIG. 23. A coin cell was constructed with a Li metal anode, a Nickel-Manganese-Cobalt (NMC) cathode and an electrolyte comprising 0.3 molal of $Mg(TFSI)_2$ salt, but no Li salt. After a resting period of 44 hours at 25° C., the cell was charged and discharged at C/20 and then cycled at C/4 at 25° C. FIG. 23 compares the cycling performance of this cell to a control cell identical in construction and operation except containing 0.6 molal LiTFSI salt instead of the $Mg(TFSI)_2$ salt. It is observed that after twelve cycles the performance of the two cells is nearly identical. Since Mg ions cannot intercalate into the NMC cathode, this indicates that some or all of the Mg ions initially in the electrolyte have been incorporated into the lithium metal anode and replaced by Li ions.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A rechargeable battery cell comprising:
 a negative electrode comprising lithium metal;
 a positive electrode, comprising an intercalation material;
 a separator that separates the negative electrode and the positive electrode; and
 an ionic liquid electrolyte comprising
  an ionic liquid solvent, having a concentration of 5% by weight to 75% by weight;
  an ether co-solvent comprises a non-fluorinated ether, wherein the non-fluorinated ether has a concentration of 5% by weight to 40% by weight; and
  a lithium salt solute.

2. The rechargeable battery cell of claim 1, wherein the negative electrode comprises a current collector comprising copper-metal or a copperized plastic film.

3. The rechargeable battery cell of claim 1, wherein the concentration of the lithium salt solute is at least 30%, by weight, of the ionic liquid electrolyte.

4. The rechargeable battery cell of claim 1, wherein the non-fluorinated ether comprises one or both of a linear ether and a cyclic ether.

5. The rechargeable battery cell of claim 1, further comprising a wetting agent, wherein the wetting agent comprises one or more of a fluorinated ether, a phosphate ester, and a phosphite.

6. The rechargeable battery cell of claim 1,
 wherein the non-fluorinated ether comprises a linear ether, and
 wherein the lithium salt solute comprises lithium bis(fluorosulfonyl)imide (LiFSI).

7. The rechargeable battery cell of claim 1, further comprising a wetting agent,
 wherein the wetting agent comprises at least one of a phosphate ester, a phosphite, and a fluorinated ether, and wherein the lithium salt solute is lithium bis(fluorosulfonyl)imide (LiFSI).

8. The rechargeable battery cell of claim 1, wherein the ionic liquid electrolyte further comprises a fluorinated ether operable as a wetting agent.

9. The rechargeable battery cell of claim 1, wherein the ionic liquid solvent comprises one or both of bis(trifluoromethanesulfonyl)imide (TFSI) and bis(fluorosulfonyl)imide (FSI).

10. The rechargeable battery cell of claim 1, wherein the ionic liquid solvent comprises one or both of propyl-methyl-pyrrolidinium-bis(trifluoromethanesulfonyl)imide and propyl-methyl-pyrrolidinium-bis(fluorosulfonyl)imide.

11. The rechargeable battery cell of claim 1, wherein the negative electrode further comprises one or both sodium, magnesium, aluminum, and potassium.

12. The rechargeable battery cell of claim 1, wherein the negative electrode further comprises sodium.

13. The rechargeable battery cell of claim 1, wherein the ionic liquid electrolyte comprises a wetting agent having a concentration of up to 50% by weight.

14. The rechargeable battery cell of claim 13, wherein the wetting agent comprises one or more of bis(2,2,2-trifluoroethyl)ether (BTFE), 1,2-(1,1,2,2-tetrafluoroethoxy)ethane, and 1,1,2,2-tetrafluoroethyl 2,2,3,3-tetrafluoropropyl ether (TFPE).

15. The rechargeable battery cell of claim 1, wherein the lithium salt solute comprises bis(trifluoromethylsulfonyl)amide (TFSI) anions.

16. The rechargeable battery cell of claim 15, wherein the lithium salt solute further comprises bis(fluorosulfonyl)imide (FSI) anions.

17. The rechargeable battery cell of claim 1, wherein the non-fluorinated ether comprises dimethoxyethane (DME).

18. The rechargeable battery cell of claim 1, wherein the ionic liquid electrolyte further comprises one or more of trimethyl phosphate (TMP), triethyl phosphate (TEP), and tris(trimethylsilyl) phosphate (TSP).

19. The rechargeable battery cell of claim 1, wherein the concentration of the lithium salt solute is 40-50%, by weight, of the ionic liquid electrolyte.

20. The rechargeable battery cell of claim 1, wherein the intercalation material is a high-voltage material operable to cycle at up to 4.6 V vs. Li/Li+.

21. The rechargeable battery cell of claim 1, wherein the intercalation material comprises one of
$LiNi_xMn_yCo_zO_2$ where x+y+z=1,
$LiCoO_2$, or
$LiNi_{0.8}Co_{0.15}Al_{0.05}O_2$.

22. A rechargeable battery cell comprising:
a negative electrode comprising lithium metal or a lithium-metal alloy;
a positive electrode, comprising an intercalation material;
a separator that separates the negative electrode and the positive electrode; and
an ionic liquid electrolyte comprising
an ionic liquid solvent, having a concentration of 5% by weight to 75% by weight;
an ether co-solvent comprises a non-fluorinated ether, wherein the non-fluorinated ether has a concentration of 5% by weight to 40% by weight; and
a lithium salt solute.

23. The rechargeable battery cell of claim 22, wherein the non-fluorinated ether comprises dimethoxyethane (DME).

24. The rechargeable battery cell of claim 22, wherein the ionic liquid solvent comprises one or more of bis(2,2,2-trifluoroethyl)ether (BTFE), 1,2-(1,1,2,2-tetrafluoroethoxy)ethane, and 1,1,2,2-tetrafluoroethyl 2,2,3,3-tetrafluoropropyl ether (TFPE).

25. The rechargeable battery cell of claim 22, wherein the ionic liquid electrolyte further comprises a fluorinated ether.

26. The rechargeable battery cell of claim 22, wherein the ionic liquid electrolyte further comprises one or more of trimethyl phosphate (TMP), triethyl phosphate (TEP), and tris(trimethylsilyl) phosphate (TSP).

27. The rechargeable battery cell of claim 22, wherein the negative electrode comprises the lithium-metal alloy comprising one or more of aluminum and magnesium.

* * * * *